(12) United States Patent
Washio

(10) Patent No.: US 11,639,428 B2
(45) Date of Patent: May 2, 2023

(54) HARDCOAT MULTILAYER FILM

(71) Applicant: RIKEN TECHNOS CORPORATION, Tokyo (JP)

(72) Inventor: Nozomu Washio, Tokyo (JP)

(73) Assignee: RIKEN TECHNOS CORPORATION

( * ) Notice: Subject to any disclaimer, the term of this patent is extended or adjusted under 35 U.S.C. 154(b) by 544 days.

(21) Appl. No.: 16/463,994

(22) PCT Filed: Nov. 7, 2017

(86) PCT No.: PCT/JP2017/040099
§ 371 (c)(1),
(2) Date: May 24, 2019

(87) PCT Pub. No.: WO2018/096921
PCT Pub. Date: May 31, 2018

(65) Prior Publication Data
US 2020/0282710 A1    Sep. 10, 2020

(30) Foreign Application Priority Data

Nov. 25, 2016  (JP) .............................. JP2016-229018

(51) Int. Cl.
*B32B 27/08* (2006.01)
*C08J 7/04* (2020.01)
(Continued)

(52) U.S. Cl.
CPC ............... *C08J 7/042* (2013.01); *B32B 27/08* (2013.01); *B32B 27/18* (2013.01); *B32B 27/308* (2013.01);
(Continued)

(58) Field of Classification Search
None
See application file for complete search history.

(56) References Cited

U.S. PATENT DOCUMENTS 3,496,143 A   2/1970 Siggel et al.
6,055,823 A   5/2000 Baker et al.
(Continued)

FOREIGN PATENT DOCUMENTS

CN    1649733 A    8/2005
CN   102686642 A   9/2012
(Continued)

OTHER PUBLICATIONS

CN201780055888.0 First Office Action dated Jul. 2, 2020, 11 pgs.
(Continued)

*Primary Examiner* — Anthony J Frost
(74) *Attorney, Agent, or Firm* — Bracewell LLP; Brad Y. Chin

(57) ABSTRACT

One embodiment is a hardcoat multilayer film which includes layers, namely, a first hardcoat, a second hardcoat and a transparent resin film sequentially from the surface layer side. The first hardcoat is formed from a coating material that does not contain inorganic particles, while containing 100 parts by mass of (A) a polyfunctional (meth) acrylate, 0.5-20 parts by mass of (B) a compound having two or more secondary thiol groups in each molecule, 0.01-7 parts by mass of (C) a water repellent agent and 0.01-10 parts by mass of (D) a silane coupling agent; and the second hardcoat is formed from a coating material that contains 100 parts by mass of (A) a polyfunctional (meth)acrylate and 30-300 parts by mass of (F) inorganic fine particles having an average particle diameter of 1-300 nm. The polyfunctional (meth)acrylate (A) may contain 20% by mass or more of a tripentaerythritol acrylate. The coating material which forms the first hardcoat may additionally contain 0.1-5 parts by mass of (E) a thiophenyl-based photopolymerization initiator.

16 Claims, 2 Drawing Sheets

(51) Int. Cl.
*B32B 27/18* (2006.01)
*B32B 27/30* (2006.01)
*B32B 27/32* (2006.01)
*B32B 27/36* (2006.01)
*C08K 3/36* (2006.01)
*C08K 5/375* (2006.01)
*C08K 5/548* (2006.01)
*C08K 5/544* (2006.01)

(52) U.S. Cl.
CPC .......... *B32B 27/322* (2013.01); *B32B 27/365* (2013.01); *C08K 3/36* (2013.01); *C08K 5/375* (2013.01); *C08K 5/548* (2013.01); *B32B 2250/03* (2013.01); *B32B 2250/04* (2013.01); *B32B 2250/24* (2013.01); *B32B 2307/412* (2013.01); *B32B 2310/0806* (2013.01); *B32B 2457/20* (2013.01); *C08K 5/544* (2013.01); *C08K 2201/003* (2013.01)

(56) References Cited

U.S. PATENT DOCUMENTS

| | | | |
|---|---|---|---|
| 6,489,015 B1 * | 12/2002 | Tsuchiya | G02B 1/14 428/212 |
| 10,596,739 B2 * | 3/2020 | Washio | B32B 27/18 |
| 10,780,685 B2 | 9/2020 | Mori et al. | |
| 2003/0022984 A1 | 1/2003 | Kawase et al. | |
| 2003/0022987 A1 | 1/2003 | Kawase et al. | |
| 2005/0249942 A1 | 11/2005 | Coggio et al. | |
| 2006/0134400 A1 * | 6/2006 | Takada | C08G 18/672 428/313.9 |
| 2006/0210727 A1 | 9/2006 | Ibuki et al. | |
| 2007/0291363 A1 * | 12/2007 | Asakura | G02B 5/0278 359/586 |
| 2008/0280086 A1 | 11/2008 | Sheridan et al. | |
| 2010/0104879 A1 | 4/2010 | Okano | |
| 2010/0147191 A1 | 6/2010 | Sakano et al. | |
| 2010/0210812 A1 | 8/2010 | Urakawa et al. | |
| 2011/0189470 A1 * | 8/2011 | Iizuka | C09D 133/08 428/323 |
| 2011/0279024 A1 | 11/2011 | Hiyama et al. | |
| 2012/0092290 A1 | 4/2012 | Itoh et al. | |
| 2012/0114892 A1 | 5/2012 | Jung et al. | |
| 2013/0059158 A1 | 3/2013 | Oguro et al. | |
| 2013/0063393 A1 | 3/2013 | Kurishima et al. | |
| 2013/0084458 A1 | 4/2013 | Yamada et al. | |
| 2013/0216801 A1 | 8/2013 | Kadoki et al. | |
| 2013/0222906 A1 | 8/2013 | Tsunekawa et al. | |
| 2014/0044891 A1 | 2/2014 | Shibata et al. | |
| 2014/0208657 A1 | 7/2014 | Kim et al. | |
| 2014/0227482 A1 | 8/2014 | Shibata et al. | |
| 2014/0360975 A1 | 12/2014 | Hustad et al. | |
| 2015/0197662 A1 | 7/2015 | Kang et al. | |
| 2015/0203711 A1 | 7/2015 | Kang et al. | |
| 2016/0122525 A1 | 5/2016 | Carloff et al. | |
| 2016/0122573 A1 | 5/2016 | Uprety et al. | |
| 2016/0214294 A1 | 7/2016 | Tsujimura et al. | |
| 2016/0229159 A1 | 8/2016 | Nakashima et al. | |
| 2016/0244634 A1 | 8/2016 | Takamura | |
| 2017/0095993 A1 | 4/2017 | Tomomatsu et al. | |
| 2017/0183543 A1 | 6/2017 | Nagata et al. | |
| 2017/0198164 A1 | 7/2017 | Itagaki et al. | |
| 2018/0072029 A1 | 3/2018 | Nakashima et al. | |

FOREIGN PATENT DOCUMENTS

| | | | |
|---|---|---|---|
| CN | 103492913 A | 1/2014 | |
| CN | 104422239 A | 3/2015 | |
| CN | 105404094 A | 3/2016 | |
| EP | 2873692 A1 | 5/2015 | |
| JP | S633011 A | 1/1988 | |
| JP | H0211665 A | 1/1990 | |
| JP | H0794061 A | 4/1995 | |
| JP | H07126606 A | 5/1995 | |
| JP | 2000052472 A | 2/2000 | |
| JP | 2000129247 A | 5/2000 | |
| JP | 2000190430 A | 7/2000 | |
| JP | 2000214791 A | 8/2000 | |
| JP | 2000517455 A | 12/2000 | |
| JP | 2002062405 A | 2/2002 | |
| JP | 2004109966 A | 4/2004 | |
| JP | 2005148444 A | 6/2005 | |
| JP | 2005181940 A | 7/2005 | |
| JP | 2005298572 A | 10/2005 | |
| JP | 2006030983 A | 2/2006 | |
| JP | 2006058574 A | 3/2006 | |
| JP | 2006082341 A | 3/2006 | |
| JP | 2006154758 A | 6/2006 | |
| JP | 2006215488 A | 8/2006 | |
| JP | 2006313239 A | 11/2006 | |
| JP | 2007025040 A | 2/2007 | |
| JP | 2007108449 A | 4/2007 | |
| JP | 2007537059 A | 12/2007 | |
| JP | 2008026883 A | 2/2008 | |
| JP | 2008090230 A | 4/2008 | |
| JP | 2008095064 A | 4/2008 | |
| JP | 2008201864 A | 9/2008 | |
| JP | 2008231220 A | 10/2008 | |
| JP | 2008538195 A | 10/2008 | |
| JP | 2009036818 A | 2/2009 | |
| JP | 2009114248 A | 5/2009 | |
| JP | 2009196125 A | 9/2009 | |
| JP | 2009241458 A | 10/2009 | |
| JP | 2009255544 A | 11/2009 | |
| JP | 2009279806 A | 12/2009 | |
| JP | 2010005817 A | 1/2010 | |
| JP | 2010038945 A | 2/2010 | |
| JP | 2010064332 A | 2/2010 | |
| JP | 2010054861 A | 3/2010 | |
| JP | 2010060190 A | 3/2010 | |
| JP | 2010064332 A | 3/2010 | |
| JP | 2010078642 A | 4/2010 | |
| JP | 2010511206 A | 4/2010 | |
| JP | 2010107823 A | 5/2010 | |
| JP | 2010120182 A | 6/2010 | |
| JP | 2010121013 A | 6/2010 | |
| JP | 2010131771 A | 6/2010 | |
| JP | 2010208035 A | 9/2010 | |
| JP | 2010211150 A | 9/2010 | |
| JP | 2010224150 A | 10/2010 | |
| JP | 2010241019 A | 10/2010 | |
| JP | 2010271400 A | 12/2010 | |
| JP | 2010275385 A | 12/2010 | |
| JP | 2011031527 A | 2/2011 | |
| JP | 2011032350 A | 2/2011 | |
| JP | 2011037927 A | 2/2011 | |
| JP | 2011083912 A | 4/2011 | |
| JP | 2011512422 A | 4/2011 | |
| JP | 2011128439 A | 6/2011 | |
| JP | 2011133862 A | 7/2011 | |
| JP | 2011175040 A | 9/2011 | |
| JP | 2011201087 A | 10/2011 | |
| JP | 2011213989 A | 10/2011 | |
| JP | 2012062385 A | 3/2012 | |
| JP | 2012111943 A | 6/2012 | |
| JP | 2012150154 A | 8/2012 | |
| JP | 2012206313 A | 10/2012 | |
| JP | 2012234163 A | 11/2012 | |
| JP | 2012250438 A | 12/2012 | |
| JP | 2013075466 A | 4/2013 | |
| JP | 2013076029 A | 4/2013 | |
| JP | 2013142113 A | 7/2013 | |
| JP | 2013155341 A | 8/2013 | |
| JP | 2013156638 A | 8/2013 | |
| JP | 2013173871 A | 9/2013 | |
| JP | 2013186236 A | 9/2013 | |
| JP | 2013205477 A | 10/2013 | |
| JP | 2014016608 A | 1/2014 | |
| JP | 201431397 A | 2/2014 | |
| JP | 2014024332 A | 2/2014 | |
| JP | 2014025061 A | 2/2014 | |
| JP | 2014080536 A | 5/2014 | |

(56) References Cited

FOREIGN PATENT DOCUMENTS

| | | | |
|---|---|---|---|
| JP | 2014117904 A | 6/2014 | |
| JP | 2014126662 A | 7/2014 | |
| JP | 2014143831 A | 8/2014 | |
| JP | 2014152237 A | 8/2014 | |
| JP | 2014152281 A | 8/2014 | |
| JP | 2014197210 A | 10/2014 | |
| JP | 2014201681 A | 10/2014 | |
| JP | 2014206707 A | 10/2014 | |
| JP | 2014238614 A | 12/2014 | |
| JP | 2014240955 A | 12/2014 | |
| JP | 2015007732 A | 1/2015 | |
| JP | 2015013472 A | 1/2015 | |
| JP | 2015013473 A | 1/2015 | |
| JP | 2015016683 A | 1/2015 | |
| JP | 2015033851 A | 2/2015 | |
| JP | 2015034285 A | 2/2015 | |
| JP | 2015034286 A | 2/2015 | |
| JP | 2015083370 A | 4/2015 | |
| JP | 2015151420 A | 8/2015 | |
| JP | 2015182272 A | 10/2015 | |
| JP | 2015182273 A | 10/2015 | |
| JP | 2015184639 A | 10/2015 | |
| JP | 2015203770 A | 11/2015 | |
| JP | 2016006160 A | 1/2016 | |
| JP | 2016011365 A | 1/2016 | |
| JP | 5870222 B1 | 2/2016 | |
| JP | 2016172423 A | 2/2016 | |
| JP | 5878255 B1 | 3/2016 | |
| JP | 2016060839 A | 4/2016 | |
| JP | 2016071085 A | 5/2016 | |
| JP | 2016172424 A | 9/2016 | |
| JP | WO2016147734 * | 9/2016 | ............ B29C 48/15 |
| JP | 2016177260 A | 10/2016 | |
| JP | WO2015098495 A1 | 3/2017 | |
| KR | 1020040094153 A | 11/2001 | |
| KR | 20040094153 A | 11/2004 | |
| KR | 20100129512 A | 12/2010 | |
| KR | 10-2013-0058565 A | 6/2013 | |
| KR | 20140056399 A | 5/2014 | |
| TW | 200609110 A | 3/2006 | |
| TW | 201300236 A | 1/2013 | |
| TW | 201420652 A | 6/2014 | |
| TW | 201437304 A | 10/2014 | |
| TW | 201504320 A | 2/2015 | |
| TW | 201602268 A | 1/2016 | |
| TW | 201638250 A | 11/2016 | |
| WO | 2005113690 A2 | 12/2005 | |
| WO | 2006102383 A1 | 9/2006 | |
| WO | 2008029766 A1 | 3/2008 | |
| WO | 2008067262 A | 6/2008 | |
| WO | 2010147142 A1 | 12/2010 | |
| WO | 2011033976 A1 | 3/2011 | |
| WO | 2011034847 A1 | 3/2011 | |
| WO | 2011145630 A1 | 11/2011 | |
| WO | 2012026446 A1 | 3/2012 | |
| WO | 2012144508 A1 | 10/2012 | |
| WO | 2012144510 A1 | 10/2012 | |
| WO | 2013129531 A1 | 9/2013 | |
| WO | 2014030848 A1 | 2/2014 | |
| WO | 2014203792 A1 | 12/2014 | |
| WO | 2015001948 A1 | 1/2015 | |
| WO | 2015005049 A | 1/2015 | |
| WO | 2015045823 A1 | 4/2015 | |
| WO | 2015098495 A1 | 7/2015 | |
| WO | 2015146565 A | 10/2015 | |
| WO | 2015150244 A1 | 10/2015 | |
| WO | 2015171340 A1 | 11/2015 | |
| WO | 2015182253 A1 | 12/2015 | |
| WO | 2016147424 A1 | 9/2016 | |
| WO | 2016147733 A1 | 9/2016 | |
| WO | 2016147734 A1 | 9/2016 | |
| WO | 2016147739 A1 | 9/2016 | |
| WO | 2016147776 A1 | 9/2016 | |
| WO | 2017200042 A1 | 11/2017 | |

OTHER PUBLICATIONS

JP2020-55297 Office Action dated May 20, 2021, 7 pgs.
TW105104240 Office Action dated Oct. 17, 2019, 10 pgs.
EP15885519.7 Third Party Observations dated Jan. 8, 2020, 85 pgs.
CN201910746657.5 First Office Action dated Oct. 27, 2020, 18 pgs.
EP17874537.8 Supplementary Search Report dated May 14, 2020, 12 pgs.
TW105104907 Office Action dated Oct. 18, 2019; 10 pages.
CN201680015902.X Second Office Action dated Jul. 17, 2019; 16 pgs.
CN201680068951.X Office Action dated Sep. 29, 2019; 21 pgs.
JP2016-17863 Office Action dated Oct. 8, 2019; 11 pgs.
EP16868622.8 Extended European Search Report dated May 20, 2019; 8 pgs.
Chinese Patent Application No. 201680015984.8 dated Jun. 4, 2019; 8 pgs.
JP2017-094366 Office Action dated May 19, 2020, 15 pgs.
PCT/JP2017/040099 International Search Report dated Feb. 13, 2018; 4 pgs.
TW105104050 Office Action dated Aug. 20, 2019; 12 pgs.
KR10-2017-7026047 Third Party Observation dated Jan. 11, 2021, 21 pgs.
JP2017-552695 Second Office Action dated Dec. 2, 2020, 5 pgs.
TW106125432 First Office Action dated Dec. 28, 2020, 14 pgs.
KR10-2019-7010129 First Office Action dated Jun. 25, 2021, 10 pgs.
CN201811070889.5 Office Action dated Jan. 10, 2020, 15 pgs.
CN201810254960.9 Decision of Rejection dated Jun. 30, 2021, 8 pgs.
Chinese Patent Application No. 201680015900.0 dated Jun. 4, 2019; 8 pgs.
TW105136889 Second Office Action dated Jan. 7, 2021, 9 pgs.
EP17850559.0 Supplementary Search Report dated Mar. 18, 2020, 10 pgs.
CN201680015901.5 Office Action dated Jan. 28, 2019; 12 pgs.
CN20160015900.0 Office Action dated Nov. 5, 2018; 12 pgs.
PCT/JP2016/084981 International Search Report dated Jan. 25, 2017; 2 pgs.
EP16764565.4 Extended European Search Report dated Oct. 18, 2018; 8 pgs.
EP16764550.6 Extended European Search Report dated Oct. 18, 2018; 8 pgs.
KR10-2017-7026048 Korean Office Action dated Nov. 1, 2018; 14 pgs.
EP16764564.7 Extended European Search Report dated Oct. 18, 2018; 8 pgs.
PCT/JP2016/084981 International Preliminary Report on Patentability dated Jun. 21, 2018; 13 pgs.
PCT/JP2016/052950 International Search Report dated Apr. 19, 2016; 2 pgs.
CN201680015908.7 Office Action dated Feb. 2, 2019; 12 pgs.
TW105104029 Office Action dated Mar. 7, 2019; 12 pgs.
JP2016-24288 Opposition Against JP6599789 dated Jun. 24, 2020, 64 pgs.
A Website of Fluorolink@PFPE (including a flurorine-containing water repellent agent "Fluorolink AD 1700"), https://www.solvay.jp/ja/markets-and-products/featured-products/Fluorolink.html, Jan. 7, 2020, 2pgs.
CN201910746657.5 Second Office Action dated Jun. 4, 2021, 15 pgs.
CN201780069802.X First Office Action dated Jul. 31, 2020, 23 pgs.
JP2017-094366 Office Action dated Jan. 26, 2021, 18 pgs.
CN201680015900.0 Office Action dated Sep. 10, 2019, 13 pgs.
EP20150371.1 Extended European Search Report dated Apr. 7, 2020, 8 pgs.
CN201810254960.9 Second Office Action dated Jun. 9, 2020, 11 pgs.
TW105104026 Office Action dated Oct. 5, 2019; 10 pgs.
JP6599789B Notice for Reasons for Revocation dated Sep. 29, 2020, 32 pgs.
TW106125432 Decision of Rejection dated Apr. 29, 2021, 11 pgs.
JP2016-29588 Office Action dated Dec. 24, 2019, 7 pgs.

(56) References Cited

OTHER PUBLICATIONS

JP2017-211513 Office Action dated Oct. 6, 2021, 9 pgs.
CN201680015850.6 Office Action dated Jan. 24, 2019; 10 pgs.
EP15885519.7 Extended European Search Report dated Oct. 18, 2018; 8Pgs.
JP2017069555 Office Action dated Nov. 27, 2018; 8 pgs.
JP6144330 Opposition Paper dated Dec. 5, 2017; 45 Pgs.
Yamamoto, et al.; Application of Chemically Absorbed Fluorocarbon Film with Highly Durability as a Mold Release Agent; Seikei-Kakou vol. 22 No. 2, 2010; pp. 104-114.
JP2015-054439 Office Action dated Aug. 24, 2016; 31 pgs.
TW104122442 Office Action dated Jul. 13, 2016; 24 pgs.
EP16764570.4 Search Report dated May 28, 2018; 8 pgs.
KR10-2016-7017502 Decision of Rejection dated May 10, 2018; 8 pgs.
EP16764607.4 Search Report dated May 28, 2018; 8 pgs.
CN201680015984.8 Office Action dated Nov. 5, 2018; 13 pgs.
PCT/JP2016/084794 International Search Report dated Jan. 25, 2017; 2 pgs.
EP20150373.7 Extended European Search Report dated Apr. 7, 2020, 9 pgs.
CN201910756415.4 First Office Action dated Dec. 31, 2020, 9 pgs.
JP2017-094366 Office Action dated Nov. 18, 2019, 11 pgs.
EP20202998.9 Extended European Search Report dated Feb. 1, 2021, 8 pgs.
EP20150365.3 Extended European Search Report dated Apr. 9, 2020, 8 pgs.
TW105104027 Office Action dated Jun. 25, 2019; 21 pages.
CN201780069802.X Second Office Action dated Nov. 25, 2020, 23 pgs.
CN201680015984.8 Office Action dated Sep. 10, 2019, 13 pgs.
EP16872835.0 Extended European Search Report dated July 8, 2019; 6 pgs.
CN201910756415.4 Second Office Action dated Aug. 3, 2021, 7 pgs.
CN201680015902.X Office Action Jan. 2, 2020, 16 pgs.
CN201810254960.9 Office Action dated Oct. 11, 2019, 13 pgs.
PCT/JP2017/027297 International Search Report dated Aug. 29, 2017; 2 pgs.
PCT/JP2016/052927 International Search Report dated Apr. 19, 2016; 2 pgs.
CN201580003516.4 Office Action dated Jun. 28, 2017; 22 pgs.
CN201580003516.4 Office Action dated Jan. 17, 2018; 20 pgs.
KR10-2016-7017502 Office Action dated Oct. 27, 2017; 18pgs.
Lai, et al., Synthetic Process and Application of Silicone Products, 2nd Edition, Nov. 2009, 4 pgs.
PCT/JP2016/053357 International Search Report dated May 17, 2016; 2 pgs.
PCT/JP2016/053355 International Search Report dated May 17, 2016; 2 pgs.
PCT/JP2016/053556 International Search Report dated May 17, 2016; 2 pgs.
PCT/JP2016/054363 International Search Report dated May 17, 2016; 2 pgs.
JP2017-152119 Office Action dated Aug. 7, 2018; 10 pgs.
KR10-2019-7001505 Office Action dated Feb. 20, 2019; 12 pgs.
CN201680015902.X Office Action dated Feb. 3, 2019; 15 pgs.
CN201811070889.5 Second Office Action dated Aug. 3, 2020, 16 pgs.
CN201810254960.9 Third Office Action dated Dec. 30, 2020, 16 pgs.
JP2020-55297 Office Action dated Dec. 23, 2021, 7 pgs.
KR10-2019-7014887 First Office Action dated Oct. 22, 2021, 11 pgs.
KR10-2017-7026040 First Office Action dated May 4, 2022, 10 pgs.
KR10-2019-7014887 Second Office Action dated Apr. 12, 2022, 11 pgs.
Evidence Document 3, Lineup of Products, Surfactants and Surface Modifiers, Information available from homepage ot DIC Corporation on the Internet, https://www.dic-global.com/ja/products/fluoro/megaface/, 2022, 14 pgs.
Opposition Paper for JP Pat. No. 7080269 dated Dec. 2, 2022, 81 pgs.

* cited by examiner

HARDCOAT MULTILAYER FILM

CROSS REFERENCE TO RELATED APPLICATIONS

This application claims the benefit of and priority to PCT/JP2017/040099, filed on Nov. 7, 2017, entitled (translation), "HARDCOAT MULTILAYER FILM," which claims the benefit of and priority to Japanese Patent Application No. 2016-229018, filed on Nov. 25, 2016, which are hereby incorporated by reference in their entirety into this application.

BACKGROUND

Embodiments relate to a hard coat laminated film. More specifically, embodiments relate to a hard coat laminated film excellent in resistance against a stylus.

DESCRIPTION OF RELATED ART

In recent years, systems capable of performing input operations by handwriting characters on an image display device, such as a liquid crystal display, a plasma display or an electroluminescence display, with a stylus have become popular. A pen tip formed of rubber or elastomer is used for a stylus for use in such a handwritten image recognition system.

For a display faceplate in a touch panel, articles using glass as the base material have been conventionally used because they meet the required properties such as heat resistance, dimensional stability, high transparency, high surface hardness and high stiffness. On the other hand, glass has disadvantages such as a low impact resistance and consequent fragility; a low processability; difficulty in handling; a high specific weight and a consequent heavy weight; and difficulty in satisfying the demand for a curved or flexible display. Thus, materials as a substitute for glass are actively being studied, and a variety of hard coat laminated films have been proposed in which a hard coat excellent in surface hardness and abrasion resistance is formed on the surface of a transparent resin film formed of triacetylcellulose, polyethylene terephthalate, polycarbonate, polymethyl methacrylate, a norbornene polymer or the like (e.g., see Patent Literatures 1 and 2).

However, the abrasion resistance is still insufficient in each of them. There has been required a hard coat laminated film having high abrasion resistance (excellent resistance against a stylus) capable of maintaining surface characteristics such as antifouling properties even after repeated handwriting input of data with a stylus.

CITATION LIST

Patent Literature

PATENT LITERATURE 1: JP-A-2000-052472
PATENT LITERATURE 2: JP-A-2000-214791

SUMMARY

An object of the various embodiments is to provide a hard coat laminated film excellent in resistance against a stylus. A further object of the various embodiments is to provide a hard coat laminated film, which is preferably excellent in resistance against a stylus, antifouling properties, transparency, color tone, abrasion resistance, surface hardness, and surface appearance and which is suitable for a member in an image display device, such as a liquid crystal display, a plasma display and an electroluminescence display (including an image display device with a touch panel function and an image display device with no touch panel function), particularly for a display faceplate in an image display device with a touch panel function and with a handwritten image recognition system installed.

As a result of intensive studies, the present inventors have found that the above object can be achieved by laminating two kinds of specific hard coats according to various embodiments.

According to at least one embodiment, there is provided a hard coat laminated film including a first hard coat, a second hard coat, and a layer of a transparent resin film sequentially from the surface layer side. The first hard coat is formed from a coating material that does not contain inorganic particles, while containing: 100 parts by mass of (A) a polyfunctional (meth)acrylate; 0.5 to 20 parts by mass of (B) a compound having two or more secondary thiol groups in each molecule; 0.01 to 7 parts by mass of (C) a water repellent agent; and 0.01 to 10 parts by mass of (D) a silane coupling agent. The second hard coat is formed from a coating material that contains: 100 parts by mass of (A) a polyfunctional (meth)acrylate; and 30 to 300 parts by mass of (F) inorganic fine particles having an average particle diameter of 1 to 300 nm.

According to at least one embodiment, (A) the polyfunctional (meth)acrylate contains 20% by mass or more of tripentaerythritol acrylate.

According to at least one embodiment, the coating material for forming the first hard coat additionally contains 0.1 to 5 parts by mass of (E) a thiophenyl-based photopolymerization initiator.

According to at least one embodiment, the (D) silane coupling agent contains one or more selected from the group consisting of a silane coupling agent having an amino group and a silane coupling agent having a mercapto group.

According to at least one embodiment, the (C) water-repellent agent contains a (meth)acryloyl group-containing fluoropolyether water repellant.

According to at least one embodiment, the coating material for forming the second hard coat further contains 0.01 to 1 part by mass of (G) a leveling agent.

According to at least one embodiment, there is provided a hard coat laminated film having a first hard coat, a second hard coat, and a layer of a transparent resin film sequentially from the surface layer side The first hard coat is formed from a coating material that does not contain inorganic particles, the second hard coat is formed from a coating material that contains inorganic particles, and a water contact angle of a surface of the first hard coat is 95° or more after 500 cycles of reciprocating rubber abrasion.

According to at least one embodiment, the coating material for forming the first hard coat contains: (A) a polyfunctional (meth)acrylate; (B) a compound having two or more secondary thiol groups in each molecule; (C) a water-repellant agent; and (D) a silane coupling agent.

According to at least one embodiment, (A) the polyfunctional (meth)acrylate contains 20% by mass or more of tripentaerythritol acrylate.

According to at least one embodiment, the coating material for forming the first hard coat further contains (E) a thiophenyl-based photopolymerization initiator.

According to at least one embodiment, the transparent resin film is a transparent multilayer film with a first acrylic resin layer (α1); an aromatic polycarbonate resin layer (β); and a second acrylic resin layer (α2) directly laminated in this order.

According to at least one embodiment, there is provided an image display device including the hard coat laminated film as described above.

The hard coat laminated film according to various embodiments is excellent in resistance against a stylus. An embodiment of the hard coat laminated film is excellent in resistance against a stylus, antifouling properties, transparency, color tone, abrasion resistance, surface hardness, and surface appearance.

Therefore, the hard coat laminated film according to various embodiments can be suitably used for a member in an image display device such as a liquid crystal display, a plasma display and an electroluminescence display (including an image display device with a touch panel function and an image display device with no touch panel function), particularly for a display faceplate in an image display device with a touch panel function and with a handwritten image recognition system installed.

DETAILED DESCRIPTION

Figure 1:
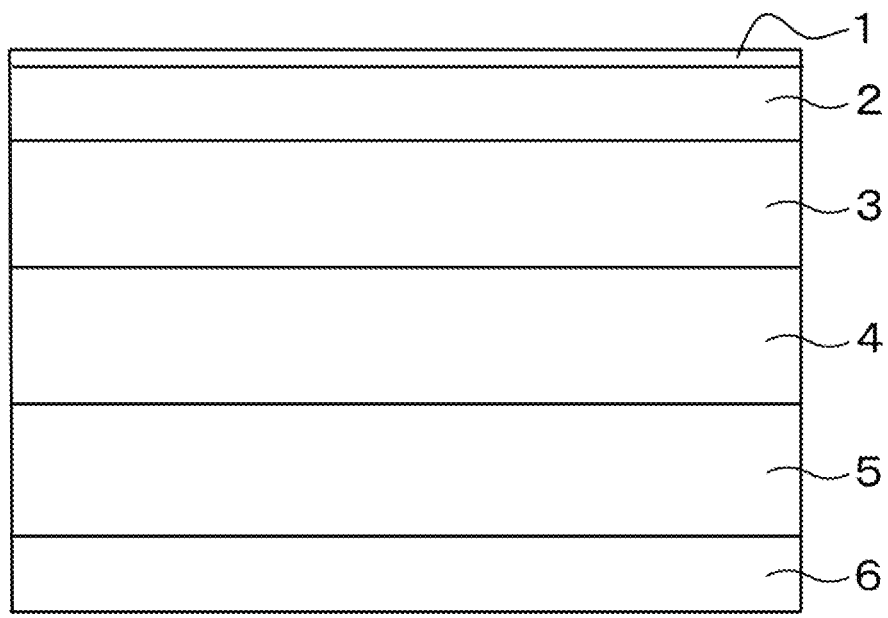
FIG. 1 is a cross-sectional view showing an example of a hard coat laminated film according to an embodiment.

The term "film" herein is used as a term including a sheet. The term "resin" is used as a term including a resin mixture including two or more resins and a resin composition including a component other than a resin. In addition, in this specification, sequentially laminating some layer and another layer means both directly laminating these layers and laminating these layers while interposing one or more of other layer(s) such as an anchor coat therebetween. The term "or more" in the numerical range herein is used to mean a certain numerical value or more than a certain numerical value. For example, 20% or more means 20% or more than 20%. The term "or less" in the numerical range is used to mean a certain numerical value or less than a certain numerical value. For example, 20% or less means 20% or less than 20%. Further, the term "to" in the numerical range is used to mean a certain numerical value, more than a certain numerical value and less than some other numerical value, or some other numerical value. Here, some other numerical value is a numerical value larger than a certain numerical value. For example, 10 to 90% means 10%, more than 10% and less than 90%, or 90%.

Other than in the examples, or where otherwise indicated, all numerical values used in the specification and claims are to be understood as being modified by the term "about". Not as an attempt to limit the application of the doctrine of equivalents to the scope of the claims, each numerical value should be construed in light of significant figures and by applying ordinary rounding techniques.

The hard coat laminated film according to various embodiments has a first hard coat, a second hard coat, and a layer of a transparent resin film sequentially from the surface layer side. The first hard coat is formed from a coating material that does not contain inorganic particles, and the second hard coat is formed from a coating material that contains inorganic particles.

The term "surface layer side" herein means a side closer to an outer surface (a display surface when used for an image display device) when an article formed of a hard coat laminate having a multilayer structure is used on site.

The inorganic particles (e.g., silica (silicon dioxide); metal oxide particles formed of aluminum oxide, zirconia, titania, zinc oxide, germanium oxide, indium oxide, tin oxide, indium tin oxide, antimony oxide, cerium oxide or the like; metal fluoride particles formed of magnesium fluoride, sodium fluoride or the like; metal sulfide particles; metal nitride particles; and metal particles) are highly effective in enhancing the hardness of a hard coat. On the other hand, the weak interaction between inorganic particles and a resin component of a coating material results in insufficient resistance against a stylus and insufficient abrasion resistance. Thus, the various embodiments allow the first hard coat constituting an outermost surface to contain no inorganic particles for retaining the resistance against a stylus and the abrasion resistance. On the other hand, the various embodiments allow the second hard coat to contain inorganic particles and preferably inorganic fine particles having an average particle size of 1 to 300 nm for enhancing the hardness, and has thereby solved this problem.

Here, "containing no" inorganic particles means not containing a significant amount of inorganic particles. In the field of coating materials for forming a hard coat, the significant amount of inorganic particles is usually about 1 part by mass or more based on 100 parts by mass of a resin component of a coating material. Therefore, "containing no" inorganic particles can be represented otherwise as follows: the amount of inorganic particles is usually 0 part by mass or more and less than 1 part by mass, preferably 0.1 part by mass or less and more preferably 0.01 part by mass or less based on 100 parts by mass of a resin component of a coating component.

Here, "containing" inorganic particles means containing a significant amount of inorganic particles in enhancing the hardness of a hard coat. In the field of coating materials for forming a hard coat, the significant amount in enhancing the hardness of a hard coat is usually about 5 parts by mass or more based on 100 parts by mass of a resin component of a coating material. Therefore, "containing" inorganic particles can be represented otherwise as follows: the amount of inorganic particles is usually 5 parts by mass or more, preferably 30 parts by mass or more, more preferably 50 parts by mass or more, still more preferably 80 parts by mass or more, even more preferably 100 parts by mass or more, and most preferably 120 parts by mass or more based on 100 parts by mass of a resin component of a coating component. The upper limit of the amount of inorganic particles herein is not particularly limited, but, for example, it may be usually 1000 parts by mass or less, preferably 500 parts by mass or less, more preferably 300 parts by mass or less, based on 100 parts by mass of a resin component of a coating material for forming a hard coat.

First Hard Coat

The first hard coat usually constitutes the surface of the hard coat laminated film according to at least one embodiment. In the case where the hard coat laminated film according to at least one embodiment is used for a display faceplate in an image display device with a touch panel function, the first hard coat usually functions as a touch surface. The first hard coat exhibits good resistance against a stylus, and serves to maintain the surface properties such as antifouling properties even when a large amount of data is handwritten.

A coating material for forming the first hard coat is not limited except for not containing inorganic particles, and any coating material can be used. Preferable examples of the coating material for forming the first hard coat include a coating material containing an active energy-ray curable resin and capable of forming a hard coat through polymerization/curing with an active energy ray such as an ultraviolet ray or an electron beam.

Examples of the active energy-ray curable resin include one or more selected from a (meth)acryloyl group-containing prepolymer or oligomer such as polyurethane (meth)acrylate, polyester (meth)acrylate, polyacryl (meth)acrylate, epoxy (meth)acrylate, polyalkylene glycol poly(meth)acrylate, and polyether (meth)acrylate; a (meth)acryloyl group-containing monofunctional reactive monomer such as methyl (meth)acrylate, ethyl (meth)acrylate, n-butyl (meth)acrylate, hexyl (meth)acrylate, 2-ethylhexyl (meth)acrylate, lauryl (meth)acrylate, isobornyl (meth)acrylate, dicyclopentenyl (meth)acrylate, dicyclopentenyloxyethyl (meth)acrylate, phenyl (meth)acrylate, phenyl cellosolve (meth)acrylate, 2-methoxyethyl (meth)acrylate, hydroxyethyl (meth)acrylate, hydroxypropyl (meth)acrylate, 2-acryloyloxyethyl hydrogen phthalate, dimethylaminoethyl (meth)acrylate, trifluoroethyl (meth)acrylate, and trimethylsiloxyethyl methacrylate; a monofunctional reactive monomer such as N-vinylpyrrolidone and styrene; a (meth)acryloyl group-containing bifunctional reactive monomer such as diethylene glycol di(meth)acrylate, neopentyl glycol di(meth)acrylate, 1,6-hexanediol di(meth)acrylate, polyethylene glycol di(meth)acrylate, 2, 2'-bis(4-(meth)acryloyloxypolyethyleneoxyphenyl) propane, and 2, 2'-bis(4-(meth)acryloyloxypolypropyleneoxyphenyl) propane; a (meth)acryloyl group-containing trifunctional reactive monomer such as trimethylolpropane tri(meth)acrylate and trimethylolethane tri(meth)acrylate; a (meth)acryloyl group-containing tetrafunctional reactive monomer such as pentaerythritol tetra(meth)acrylate; and a (meth)acryloyl group-containing hexafunctional reactive monomer such as dipentaerythritol hexaacrylate, and a resin containing one or more of these monomers as constituent monomers. One of them or a mixture of two or more thereof can be used for the active energy-ray curable resin. The term (meth)acrylate herein means acrylate or methacrylate.

When the hard coat laminated film according to at least one embodiment is used as a display faceplate of an image display device having a touch panel function, particularly a display faceplate of an image display device having a touch panel function and installed with a handwritten image recognition system, from viewpoints of resistance against a stylus, antifouling properties, transparency, color tone, abrasion resistance, surface hardness, and surface appearance, it is preferable for the coating material for forming the first hard coat to be a coating material that does not contain inorganic particles, while containing (A) a polyfunctional (meth)acrylate, (B) a compound having two or more secondary thiol groups in each molecule, (C) a water-repellant agent, and (D) a silane coupling agent. The coating material for forming the first hard coat is still more preferably a coating material that does not contain inorganic particles, while containing (A) a polyfunctional (meth)acrylate containing 20% by mass or more of a tripentaerythritol acrylate, (B) a compound having two or more secondary thiol groups in each molecule, (C) a water-repellant agent, and (D) a silane coupling agent.

The coating material for forming the first hard coat is more preferably a coating material that does not contain inorganic particles, while containing (A) a polyfunctional (meth)acrylate, (B) a compound having two or more secondary thiol groups in each molecule, (C) a water-repellant agent, (D) a silane coupling agent, and (E) a thiophenyl-based photopolymerization initiator. The coating material for forming the first hard coat is even more preferably a coating material that does not contain inorganic particles, while containing (A) a polyfunctional (meth)acrylate containing 20% by mass or more of a tripentaerythritol acrylate, (B) a compound having two or more secondary thiol groups in each molecule, (C) a water-repellant agent, (D) a silane coupling agent, and (E) a thiophenyl-based photopolymerization initiator.

(A) Polyfunctional (Meth)Acrylate

Since polyfunctional (meth)acrylate as component (A) has two or more (meth)acryloyl groups in one molecule, it serves to form a hard coat through polymerization/curing with an active energy ray such as a UV ray and an electron beam.

Examples of the above-described polyfunctional (meth)acrylates include (meth)acryloyl group-containing bifunctional reactive monomers such as diethylene glycol di(meth)acrylate, neopentyl glycol di(meth)acrylate, 1,6-hexanediol di(meth)acrylate, polyethylene glycol di(meth)acrylate, 2,2'-bis(4-(meth)acryloyloxypolyethyleneoxyphenyl)propane and 2,2'-bis(4-(meth)acryloyloxypolypropyleneoxyphenyl) propane; (meth)acryloyl group-containing trifunctional reactive monomers such as trimethylolpropane tri(meth)acrylate, trimethylolethane tri(meth)acrylate, and pentaerythritol tri(meth)acrylate; (meth)acryloyl group-containing tetrafunctional reactive monomers such as pentaerythritol tetra(meth)acrylate; (meth)acryloyl group-containing hexafunctional reactive monomers such as dipentaerythritol hexaacrylate; (meth)acryloyl group-containing heptafunctional or octafunctional reactive monomers such as tripentaerythritol acrylate and polymers (oligomers and prepolymers) including one or more of them as constituent monomers.

From a viewpoint of resistance against a stylus, the polyfunctional (meth)acrylate as component (A) is still more preferably a (meth)acrylate having three or more (meth)acryloyl groups in each molecule, more preferably a (meth)acrylate having four or more (meth)acryloyl groups in each molecule, and further preferably a (meth)acrylate having six or more (meth)acryloyl groups in each molecule.

From a viewpoint of resistance against a stylus, the polyfunctional (meth)acrylate as component (A) may be preferably a mixture of (meth)acrylates having two or more (meth)acryloyl groups in each molecule and the mixture may contain tripentaerythritol acrylate in an amount of preferably 20% by mass or more, more preferably 40% by mass or more, and still more preferably 50% by mass or more. Component (A) may contain tripentaerythritol acrylate in an amount of 100% by mass or less, or less than 100% by mass, or 90% by mass or less, or 80% by mass or less. In addition, component (A) may contain tripentaerythritol acrylate in an amount of 20% by mass or more and 100% by mass or less, 20% by mass or more and less than 100% by mass, 20% by mass or more and 90% by mass or less, 20% by mass or more and 80% by mass or less, 40% by mass or more and 100% by mass or less, 40% by mass or more and less than 100% by mass, 40% by mass or more and 90% by mass or less, 40% by mass or more and 80% by mass or less, 50% by mass or more and 100% by mass or less, 50% by mass or more and less than 100% by mass, 50% by mass or more and 90% by mass or less, or 50% by mass or more and 80% by mass or less.

From a viewpoint of resistance against a stylus, the polyfunctional (meth)acrylate as component (A) may be most preferably a mixture of tripentaerythritol acrylate and one or more selected from the group consisting of dipentaerythritol acrylate, monopentaerythritol acrylate, and polypentaerythritol acrylate. Here, the content of tripentaerythritol acrylate in the above mixture may be preferably 20% by mass or more, more preferably 40% by mass or more, still more preferably 50% by mass or more, assuming that the sum of the respective components is 100% by mass. In another embodiment, the content of tripentaerythritol acrylate in the above mixture may be 20 to 80% by mass, 40 to 80% by mass, or 50 to 80% by mass, assuming that the sum of the respective components is 100% by mass.

The tripentaerythritol acrylate is a compound having a structure in which three pentaerythritol acrylates are linked, and has 8 or 7 (when a hydroxyl group remains at a terminal end) acryloyl groups. That is, the tripentaerythritol acrylate refers to tripentaerythritol heptaacrylate, tripentaerythritol octaacrylate, or a mixture thereof. The structure of a polyfunctional pentaerythritol acrylate is shown in the following formula (1). Here, when n=2 and R is H or COCH=CH$_2$, this formula represents tripentaerythritol heptaacrylate or tripentaerythritol octaacrylate (collectively referred to as "tripentaerythritol acrylate"). Although a molar ratio of H to COCH=CH$_2$ for R is not particularly limited, the ratio may usually range from 40:60 to 80:20 from a viewpoint of optimization of viscosity to be obtained, more typically from 50:50 to 70:30.

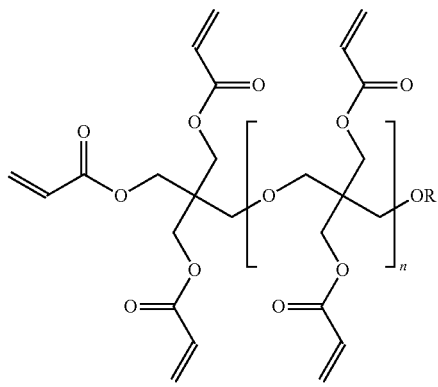

The dipentaerythritol acrylate is a compound (n=1 in the above formula (1)) having a structure in which two pentaerythritol acrylates are linked, and has 6 or 5 (when a hydroxyl group remains at a terminal end) acryloyl groups.

The monopentaerythritol acrylate has is a compound in which n=0 in the above formula (1) and has 4 or 3 (when a hydroxyl group remains at a terminal end) acryloyl groups.

The polypentaerythritol acrylate is a compound having a structure in which four or more pentaerythritol acrylates are linked, and, assuming that the number of linkages is N(=n+1), it has (2N+2) or (2N+1) (when a hydroxyl group remains at a terminal end) acryloyl groups. Although the upper limit of the number of linkages N is theoretically not particularly limited, it may be usually 6 or less from viewpoints of optimization of viscosity of a coating material including this and the possibility of actual synthesis.

For the polyfunctional (meth)acrylate as component (A), one of the above-described polyfunctional (meth)acrylates or a mixture of two or more thereof can be used.

(B) Compound Having Two or More Secondary Thiol Groups in Each Molecule

The compound having two or more secondary thiol groups in each molecule as component (B) interacts with component (A) to serve to dramatically improve resistance against a stylus.

The compound having two or more secondary thiol groups in each molecule as component (B) may have one or two or more polymerizable functional groups other than the secondary thiol group, such as (meth)acryloyl groups, vinyl groups, epoxy groups, and isocyanate groups, in each molecule. Herein, a compound having two or more secondary thiol groups in each molecule and having two or more (meth)acryloyl groups is component (B).

Examples of the compound having two or more secondary thiol groups in each molecule include 1,4-bis(3-mercaptobutyryloxy)butane, 1,3,5-tris(3-mercaptobutyryloxyethyl)-1,3,5-triazine-2,4,6(1H,3H,5H)-trione, trimethylolpropane tris(3-mercaptobutyrate), trimethylolethane tris(3-mercaptobutyrate), and pentaerythritol tetrakis(3-mercaptobutyrate). Among them, a compound having four or more secondary thiol groups in each molecule is preferable from a viewpoint of resistance against a stylus. One of them or a mixture of two or more thereof can be used for the compound having two or more secondary thiol groups in each molecule as the compound (B).

The amount of the compound having two or more secondary thiol groups in each molecule as component (B) to be blended may be usually 0.5 parts by mass or more, preferably 1 part by mass or more, more preferably 2 parts by mass or more, still more preferably 3 parts by mass or more, based on 100 parts by mass of component (A), from a viewpoint of resistance against a stylus. At the same time, the amount of component (B) to be blended may be usually 20 parts by mass or less, preferably 15 parts by mass or less, more preferably 12 parts by mass or less, still more preferably 10 parts by mass or less, from a viewpoint of surface hardness. In one embodiment, the amount of component (B) to be blended may be usually 0.5 parts by mass or more and 20 parts by mass or less, preferably 0.5 parts by mass or more and 15 parts by mass or less, 0.5 parts by mass or more and 12 parts by mass or less, 0.5 parts by mass or more and 10 parts by mass or less, 1 part by mass or more and 20 parts by mass or less, 1 part by mass or more and 15 parts by mass or less, 1 part by mass or more and 12% by mass or less, 1 part by mass or more and 10 parts by mass or less, 2 parts by mass or more and 20 parts by mass or less, 2 parts by mass or more and 15 parts by mass or less, 2 parts by mass or more and 12 parts by mass or less, 2 parts by mass or more and 10 parts by mass or less, 3 parts by mass or more and 20 parts by mass or less, 3 parts by mass or more and 15 parts by mass or less, 3 parts by mass or more and 12 parts by mass or less, or 3 parts by mass or more and 10 parts by mass or less, based on 100 parts by mass of component (A).

(C) Water-Repellant Agent

The water-repellent agent as component (C) serves to enhance the resistance against a stylus, the resistance to fouling (or stain) and the wipeability against fouling (or stain).

Examples of the water-repellent agent include wax water repellants such as a paraffin wax, a polyethylene wax and an acrylic-ethylene copolymer wax; silicone water repellants such as a silicon oil, a silicon resin, a polydimethylsiloxane and an alkylalkoxysilane; and fluorine-containing water repellants such as a fluoropolyether water repellant and a fluoropolyalkyl water repellant. One of them or a mixture of two or more thereof can be used for the water-repellent agent as component (C).

Among them, a fluoropolyether water repellant is preferred for the water-repellent agent as component (C) from a viewpoint of water repellent performance. A water-repellent agent including a compound having a (meth)acryloyl group and a fluoropolyether group in the molecule (hereinafter, abbreviated as a (meth)acryloyl group-containing fluoropolyether water repellant) is more preferred for the water-repellent agent as component (C) from a viewpoint that component (C) and component (A) and/or component (B) can chemically bond or strongly interact together to prevent troubles such as the bleed-out of component (C). Still more preferred for the water-repellent agent as component (C) is an admixture of an acryloyl group-containing fluoropolyether water repellant and a methacryloyl group-containing fluoropolyether water repellant from a viewpoint of appropriately controlling the chemical bond or the interaction with component (A) and/or component (B) to allow to exhibit good water repellency while keeping the transparency high.

The amount of the water-repellent agent as component (C) to be blended may be usually 7 parts by mass or less, preferably 4 parts by mass or less, and more preferably 2 parts by mass or less based on 100 parts by mass of component (A) from a viewpoint of preventing troubles such as the bleed-out of component (C). At the same time, the amount of the water-repellent agent as component (C) to be blended may be usually 0.01 part by mass or more, preferably 0.05 parts by mass or more, and more preferably 0.1 part by mass or more from a viewpoint of obtaining the effect of use thereof. In one embodiment, the amount of component (C) to be blended may be usually 0.01 part by mass or more and 7 parts by mass or less, and preferably be 0.01 part by mass or more and 4 parts by mass or less, or 0.01 part by mass or more and 2 parts by mass or less, or preferably 0.05 parts by mass or more and 7 parts by mass or less, or 0.05 parts by mass or more and 4 parts by mass or less, or 0.05 parts by mass or more and 2 parts by mass or less, or preferably 0.1 part by mass or more and 7 parts by mass or less, or 0.1 part by mass or more and 4 parts by mass or less, or 0.1 part by mass or more and 2 parts by mass or less.

(D) Silane Coupling Agent

The silane coupling agent as component (D) serves to enhance the adhesiveness between the first hard coat and the second hard coat.

The silane coupling agent is a silane compound having at least two types of different reactive groups: a hydrolyzable group (e.g., an alkoxy group such as a methoxy group and an ethoxy group; an acyloxy group such as acetoxy group; and a halogen group such as a chloro group) and an organic functional group (e.g., an amino group, a mercapto group, a vinyl group, an epoxy group, a methacryloxy group, an acryloxy group and an isocyanate group). Among them, silane coupling agents having an amino group (i.e., silane coupling compounds having an amino group and a hydrolyzable group) and silane coupling agents having a mercapto group (i.e., silane coupling compounds having a mercapto group and a hydrolyzable group) are preferred for the silane coupling agent as component (D) from a viewpoint of adhesiveness. Silane coupling agents having an amino group are more preferred from a viewpoint of adhesiveness and odor.

Examples of the silane coupling agent having an amino group include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane and N-(vinylbenzyl)-2-aminoethyl-3-aminopropyltrimethoxysilane.

Examples of the silane coupling agent having a mercapto group include 3-mercaptopropylmethyldimethoxysilane and 3-mercaptopropyltrimethoxysilane.

One of them or a mixture of two or more thereof can be used for the silane coupling agent as component (D).

The amount of the silane coupling agent as component (D) to be blended may be usually 0.01 part by mass or more, preferably 0.05 parts by mass or more, and more preferably 0.1 part by mass or more based on 100 parts by mass of component (A) from a viewpoint of obtaining the adhesiveness-enhancing effect reliably. At the same time, the amount of component (D) to be blended may be usually 10 parts by mass or less, preferably 5 parts by mass or less, and more preferably 1 part by mass or less from a viewpoint of a pot life of a coating material. In one embodiment, the amount of component (D) to be blended may be usually 0.01 part by mass or more and 10 parts by mass or less, and preferably be 0.01 part by mass or more and 5 parts by mass or less, or 0.01 part by mass or more and 1 part by mass or less, or preferably 0.05 parts by mass or more and 10 parts by mass or less, or 0.05 parts by mass or more and 5 parts by mass or less, or 0.05 parts by mass or more and 1 part by mass or less, or preferably 0.1 part by mass or more and 10 parts by mass or less, or 0.1 part by mass or more and 5 parts by mass or less, or 0.1 part by mass or more and 1 part by mass or less.

It is preferable that the coating material for forming the first hard coat further contains a compound having two or more isocyanate groups (—N—C=O) in one molecule and/or a photopolymerization initiator from a viewpoint of improved curability with an active energy ray.

Examples of the compound having two or more isocyanate groups in one molecule include methylenebis-4-cyclohexylisocyanate; polyisocyanates such as a trimethylolpropane adduct form of tolylene diisocyanate, a trimethylolpropane adduct form of hexamethylene diisocyanate, a trimethylolpropane adduct form of isophorone diisocyanate, an isocyanurate form of tolylene diisocyanate, an isocyanurate form of hexamethylene diisocyanate, an isocyanurate form of isophorone diisocyanate and a biuret form of hexamethylene diisocyanate; and urethane crosslinking agents such as blocked isocyanates of the polyisocyanates. One of them or a mixture of two or more thereof can be used for the compound having two or more isocyanate groups in one molecule. In crosslinking, a catalyst such as dibutyltin dilaurate and dibutyltin diethylhexoate may be added as necessary.

Examples of the photopolymerization initiator may include benzophenone compounds such as benzophenone, methyl-o-benzoyl benzoate, 4-methylbenzophenone, 4,4'-bis(diethylamino)benzophenone, methyl o-benzoylbenzoate, 4-phenylbenzophenone, 4-benzoyl-4'-methyldiphenyl sulfide, 3,3',4,4'-tetra(tert-butylperoxycarbonyl)benzophenone and 2,4,6-trimethylbenzophenone; benzoin compounds such as benzoin, benzoin methyl ether, benzoin ethyl ether, benzoin isopropyl ether and benzyl methyl ketal; acetophenone compounds such as acetophenone, 2,2-dimethoxy-2-phenylacetophenone and 1-hydroxycyclohexyl phenyl ketone; anthraquinone compounds such as methylanthraquinone, 2-ethylanthraquinone and 2-amylanthraquinone; thioxanthone compounds such as thioxanthone, 2,4-diethylthioxanthone and 2,4-diisopropylthioxanthone; alkylphenone compounds such as acetophenone dimethyl ketal; triazine compounds; biimidazole compounds; acylphosphine oxide compounds; titanocene compounds; oxime ester compounds; oxime phenylacetate compounds; hydroxyketone compounds; thiophenyl compounds such as 2-methyl-1-(4-methylthiophenyl)-2-morpholinopropan-1-one; and aminobenzoate compounds. Among them, acetophenone compounds and thiophenyl compounds are preferred. One of them or a mixture of two or more thereof can be used for the photopolymerization initiator.

The amount of the photopolymerization initiator to be blended may be usually 10 parts by mass or less, preferably 7 parts by mass or less, and more preferably 5 parts by mass or less based on 100 parts by mass of component (A) from a viewpoint of preventing formation of a yellow-discolored hard coat. The amount of the photopolymerization initiator to be blended may be usually 0.1 part by mass or more, preferably 0.5 parts by mass or more, more preferably 1 part by mass or more, and still more preferably 2 parts by mass or more from a viewpoint of reliably obtaining the effect of use of the photopolymerization initiator. The amount of the photopolymerization initiator to be blended may be usually 0.1 part by mass or more and 10 parts by mass or less, and preferably 0.1 part by mass or more and 7 parts by mass or less, 0.1 part by mass or more and 5 parts by mass or less, 0.5 parts by mass or more and 10 parts by mass or less, 0.5 parts by mass or more and 7 parts by mass or less, 0.5 parts by mass or more and 5 parts by mass or less, 1 part by mass or more and 10 parts by mass or less, 1 part by mass or more and 7 parts by mass or less, 1 part by mass or more and 5 parts by mass or less, 2 parts by mass or more and 10 parts by mass or less, 2 parts by mass or more and 7 parts by mass or less, or 2 parts by mass or more and 5 parts by mass or less.

The coating material for forming the first hard coat can contain one or two or more of additives such as an antistatic agent, a surfactant, a leveling agent, a thixotropy-imparting agent, an antifouling agent (or stain-proofing agent), a printability improver, an antioxidant, a weatherability stabilizer, a light resistance stabilizer, a UV absorber, a heat stabilizer, organic fine particles and an organic colorant, as desired, to the extent of not interfering with the object of the various embodiments.

The coating material for forming the first hard coat may contain a solvent as desired for dilution to a concentration which allows easy application. The solvent is not particularly limited as long as the solvent neither reacts with any of components (A) to (D) and other optional components nor catalyzes (promotes) the self-reaction (including degradation reaction) of these components. Examples of the solvent may include 1-methoxy-2-propanol, ethyl acetate, n-butyl acetate, toluene, methyl ethyl ketone, methyl isobutyl ketone, diacetone alcohol and acetone. One of them or a mixture of two or more thereof can be used for the solvent.

The coating material for forming the first hard coat can be obtained by mixing and stirring these components.

The method for forming the first hard coat using the coating material for forming the first hard coat is not particularly limited, and any known web coating method can be used. Examples of the above method may include roll coating, gravure coating, reverse coating, roll brushing, dip coating, spray coating, spin coating, air knife coating and die coating.

The thickness of the first hard coat may be preferably 0.5 µm or more, more preferably 1 µm or more from viewpoints of resistance to touch panel and surface hardness. At the same time, the thickness of the first hard coat may be preferably 5 µm or less, more preferably 4 µm or less, and still more preferably 3 µm or less from a viewpoint of surface hardness and the adhesiveness to the second hard coat. In one embodiment, the thickness of the first hard coat may be preferably 0.5 µm or more and 5 µm or less, or 0.5 µm or more and 4 µm or less, or 0.5 µm or more and 3 µm or less, or preferably 1 µm or more and 5 µm or less, or 1 µm or more and 4 µm or less, or 1 µm or more and 3 µm or less.

Second Hard Coat

A coating material for forming the second hard coat is not limited except for containing inorganic particles, and any coating material can be used. Preferable examples of the coating material for forming the second hard coat include a coating material further containing an active energy-ray curable resin and capable of forming a hard coat through polymerization/curing with an active energy ray such as an ultraviolet ray or an electron beam.

As the active energy-ray curable resin, those described above in the description of the coating material for forming the first hard coat can be used. However, the active energy-ray curable resin in the coating material for forming the first hard coat and the active energy-ray curable resin in the coating material for forming the second hard coat may be the same or different. One of them or a mixture of two or more thereof can be used for the active energy-ray curable resin.

When the hard coat laminated film according to at least one embodiment is used as a display faceplate of an image display device having a touch panel function, particularly a display faceplate of an image display device having a touch panel function and installed with a handwritten image recognition system, from viewpoints of resistance against a stylus, antifouling properties, transparency, color tone, abrasion resistance, surface hardness, and surface appearance, it is preferable for the coating material for forming the second hard coat to be a coating material that contains (A) a polyfunctional (meth)acrylate and (F) inorganic fine particles having an average particle diameter of 1 to 300 nm. More preferred is a coating material containing (A) a polyfunctional (meth)acrylate, (F) inorganic fine particles having an average particle diameter of 1 to 300 nm, and (G) a leveling agent.

As (A) the polyfunctional (meth)acrylate, those described above in the description of the coating material for forming the first hard coat can be used. However, (A) the polyfunctional (meth)acrylate in the coating material for forming the first hard coat and (A) the polyfunctional (meth)acrylate in the coating material for forming the second hard coat may be the same or different One of them or a mixture of two or more thereof can be used for component (A).

(F) Inorganic Fine Particles Having an Average Particle Diameter of 1 to 300 nm

The inorganic fine particles having an average particle diameter of 1 to 300 nm as component (F) serve to dramatically enhance the hardness of the hard coat laminated film according to at least one embodiment.

Examples of the inorganic fine particles include silica (silicon dioxide); metal oxide fine particles formed of aluminum oxide, zirconia, titania, zinc oxide, germanium oxide, indium oxide, tin oxide, indium tin oxide, antimony oxide, cerium oxide or the like; metal fluoride fine particles formed of magnesium fluoride, sodium fluoride or the like; metal sulfide fine particles; metal nitride fine particles; and metal fine particles.

Among them, fine particles formed of silica or aluminum oxide are preferred and fine particles formed of silica are more preferred in order to obtain a hard coat having higher surface hardness. Examples of commercial silica fine particles include Snowtex (trade name) available from Nissan Chemical Industries, Ltd. and Quartron (trade name) available from Fuso Chemical Co., Ltd.

In order to enhance the dispersibility of inorganic fine particles in the coating material or enhance the surface hardness of a hard coat to be obtained, it is preferred to use inorganic fine particles the surface of which have been treated with a silane coupling agent such as a vinylsilane and an aminosilane; a titanate coupling agent; an aluminate coupling agent; an organic compound having a reactive functional group such as an ethylenic unsaturated bond group such as a (meth)acryloyl group, a vinyl group and an allyl group and an epoxy group; a surface-treatment agent such as a fatty acid and a fatty acid metal salt; or the like.

The average particle diameter of the inorganic fine particles as component (F) may be usually 300 nm or less, preferably 200 nm or less, and more preferably 120 nm or less from viewpoints of retaining the transparency of a hard coat and obtaining the hardness-improving effect reliably. For the lower limit of the average particle diameter, inorganic fine particles commonly available have an average particle diameter of about 1 nm at the finest.

In the present specification, the average particle diameter of inorganic fine particles is a particle diameter at which a cumulative value from the smallest particle diameter reaches 50% by mass as determined by using a laser diffraction/scattering method. The average particle diameter of inorganic fine particles can be calculated as a particle diameter at which a cumulative value from the smallest particle diameter reaches 50% by mass in a particle diameter distribution curve determined by using a laser diffraction/scattering particle diameter analyzer "MT 3200 11" (trade name) available from Nikkiso Co., Ltd.

The amount of the inorganic fine particles having an average particle diameter of 1 to 300 nm as component (F) to be blended may be usually 30 parts by mass or more, preferably 50 parts by mass or more, more preferably 80 parts by mass or more, still more preferably 100 parts by mass or more, and most preferably 120 parts by mass or more based on 100 parts by mass of component (A) from a viewpoint of surface hardness. At the same time, the amount of component (F) to be blended may be usually 300 parts by mass or less, preferably 250 parts by mass or less, and more preferably 200 parts by mass or less from a viewpoint of transparency. In one embodiment, the amount of component (F) to be blended may be usually 30 parts by mass or more and 300 parts by mass or less, preferably 30 parts by mass or more and 250 parts by mass or less, 30 parts by mass or more and 200 parts by mass or less, 50 parts by mass or more and 300 parts by mass or less, 50 parts by mass or more and 250 parts by mass or less, 50 parts by mass or more and 200 parts by mass or less, 80 parts by mass or more and 300 parts by mass or less, 80 parts by mass or more and 250 parts by mass or less, 80 parts by mass or more and 200 parts by mass or less, 100 parts by mass or more and 300 parts by mass or less, 100 parts by mass or more and 250 parts by mass or less, 100 parts by mass or more and 200 parts by mass or less, 120 parts by mass or more and 300 parts by mass or less, 120 parts by mass or more and 250 parts by mass or less, or 120 parts by mass or more and 200 parts by mass or less.

(G) Leveling Agent

The coating material for forming the second hard coat preferably further contains (G) a leveling agent from a viewpoint of smoothing the surface of the second hard coat to facilitate to form the first hard coat.

Examples of the leveling agent include acrylic leveling agents, silicone leveling agents, fluorine-including leveling agents, silicone-acrylic copolymer leveling agents, fluorine-modified acrylic leveling agents, fluorine-modified silicone leveling agents, and leveling agents into which a functional group (e.g., an alkoxy group such as a methoxy group and an ethoxy group, an acyloxy group, a halogen group, an amino group, a vinyl group, an epoxy group, a methacryloxy group, an acryloxy group and an isocyanate group) is introduced. Among them, silicone-acrylic copolymer leveling agents are preferred for the leveling agent as component (G). One of them or a mixture of two or more thereof can be used for component (G).

The amount of the leveling agent as component (G) to be blended may be usually 0.01 part by mass or more, preferably 0.1 part by mass or more, and more preferably 0.2 parts by mass or more based on 100 parts by mass of component (A) from a viewpoint of smoothing the surface of the second hard coat to facilitate to form the first hard coat. At the same time, the amount of component (G) to be blended may be 1 part by mass or less, preferably 0.6 parts by mass or less, and more preferably 0.4 parts by mass or less from a viewpoint of satisfactorily applying the coating material for forming the first hard coat on the second hard coat without being repelled. In one embodiment, the amount of component (G) to be blended may be usually 0.01 part by mass or more and 1 part by mass or less, preferably 0.01 part by mass or more and 0.6 parts by mass or less, or 0.01 part by mass or more and 0.4 parts by mass or less, or preferably 0.1 part by mass or more and 1 part by mass or less, or 0.1 part by mass or more and 0.6 parts by mass or less, or 0.1 part by mass or more and 0.4 parts by mass or less, or preferably 0.2 parts by mass or more and 1 part by mass or less, or 0.2 parts by mass or more and 0.6 parts by mass or less, or 0.2 parts by mass or more and 0.4 parts by mass or less.

It is preferable that the coating material for forming the second hard coat further contains a compound having two or more isocyanate groups (—N=C=O) in one molecule and/or a photopolymerization initiator from a viewpoint of improved curability with an active energy ray.

For the compound having two or more isocyanate groups in each molecule, those described above in the description of the coating material for forming the first hard coat can be used. One of them or a mixture of two or more thereof can be used for the compound having two or more isocyanate groups in one molecule.

For the photopolymerization initiator, those described above in the description of the coating material for forming the first hard coat can be used. One of them or a mixture of two or more thereof can be used for the photopolymerization initiator.

The coating material for forming the second hard coat can contain one or two or more of additives such as an antistatic agent, a surfactant, a thixotropy-imparting agent, an antifouling agent (or stain-proofing agent), a printability improver, an antioxidant, a weatherability stabilizer, a light resistance stabilizer, a UV absorber, a heat stabilizer, a colorant and organic fine particles, as desired.

The coating material for forming the second hard coat may contain a solvent as desired for dilution to a concentration which allows easy application. The solvent is not particularly limited as long as the solvent neither reacts with any of components (A) and (F) and other optional components nor catalyzes (promotes) the self-reaction (including degradation reaction) of these components. Examples of the solvent may include 1-methoxy-2-propanol, ethyl acetate, n-butyl acetate, toluene, methyl ethyl ketone, methyl isobutyl ketone, diacetone alcohol and acetone. Among them, 1-methoxy-2-propanol is preferred. One of them or a mixture of two or more thereof can be used for the solvent.

The coating material for forming the second hard coat can be obtained by mixing and stirring these components.

The method for forming the second hard coat using the coating material for forming the second hard coat is not particularly limited, and known web coating methods can be used. Examples of the above method may include roll coating, gravure coating, reverse coating, roll brushing, dip coating, spray coating, spin coating, air knife coating and die coating.

The thickness of the second hard coat may be preferably 10 μm or more, more preferably 15 μm or more and still more preferably 18 μm or more from a viewpoint of surface hardness. At the same time, the thickness of the second hard coat may be preferably 30 μm or less, more preferably 27 μm or less, and still more preferably 25 μm or less from viewpoints of curling resistance and bending resistance. In one embodiment, the thickness of the second hard coat may be preferably 10 μm or more and 30 μm or less, or 10 μm or more and 27 μm or less, or 10 μm or more and 25 μm or less, or preferably 15 μm or more and 30 μm or less, or 15 μm or more and 27 μm or less, or 15 μm or more and 25 μm or less, or preferably 18 μm or more and 30 μm or less, or 18 μm or more and 27 μm or less, or 18 μm or more and 25 μm or less.

Transparent Resin Film

The transparent resin film is a layer functioning as a transparent film substrate for forming the first hard coat and the second hard coat thereabove. Any transparent resin film can be used for the transparent resin film without limitation as long as it has high transparency and no coloring. Examples of the transparent resin film may include films formed of a cellulose ester resin such as triacetylcellulose; a polyester resin such as polyethylene terephthalate; a cyclic hydrocarbon resin such as an ethylene-norbornene copolymer; an acrylic resin such as polymethyl methacrylate, polyethyl methacrylate, and vinylcyclohexane/methyl (meth)acrylate copolymer; an aromatic polycarbonate resin; a polyolefin resin such as polypropylene and 4-methyl-pentene-1; a polyamide resin; a polyarylate resin; a polymer-type urethane acrylate resin; and a polyimide resin. These films encompass cast films, uniaxially oriented films and biaxially oriented films. Further, the transparent resin film encompasses laminated films with one or two or more types of these films in two or more layers.

The thickness of the transparent resin film, which is not particularly limited, can be any thickness as desired. The thickness of the transparent resin film may be usually 20 μm or more and preferably 50 μm or more from a viewpoint of the handleability of the hard coat laminated film according to at least one embodiment. In the case where the hard coat laminated film according to at least one embodiment is used for a display faceplate, the thickness of the transparent resin film may be usually 300 μm or more, preferably 500 μm or more, and more preferably 600 μm or more from a viewpoint of retaining the stiffness. Further, the thickness of the transparent resin film may be usually 1500 pmn or less, preferably 1200 pmn or less and more preferably 1000 μm or less from a viewpoint of meeting the requirement for a thinner device. When the hard coat laminated film according to at least one embodiment is used in applications in which high stiffness is not required, the thickness of the hard coat laminated film may be usually 250 μm or less and preferably 150 μm or less from a viewpoint of economic efficiency.

The thickness of the transparent resin film is substantially constant over the entire film. The term "substantially constant thickness" as used herein means that the thickness is within a range of about −5 to +5 μm as a variation in a process/quality control usually performed industrially (this also applies to each layer when the film has a multilayer structure as described below). For example, when the thickness of the transparent resin film to be produced is set to 100 μm, if the thickness of the film varies within a range of −5 to +5 μm at the maximum such that the thickness at a certain position of the film is 95 μm and the thickness at another position of the film is 105 μm, it can be said that the film has a substantially constant thickness of 100 μm.

The transparent resin film is preferably a transparent resin film of an acrylic resin.

Examples of the acrylic resin may include a (meth)acrylate (co)polymer, a copolymer mainly composed of a structural unit derived from a (meth)acrylic acid ester (usually 50 mol % or more, preferably 65 mol % or more, more preferably 70 mol % or more), and modified products thereof. The term (meth)acrylic means acryl or methacryl. The term (co)polymer means a polymer or a copolymer.

Examples of the (meth)acrylate (co)polymer may include polymethyl (meth)acrylate, polyethyl (meth)acrylate, polypropyl (meth)acrylate, polybutyl (meth)acrylate, a methyl (meth)acrylate-butyl (meth)acrylate copolymer, and an ethyl (meth)acrylate-butyl (meth)acrylate copolymer.

Examples of the copolymer mainly composed of a structural unit derived from a (meth)acrylic acid ester may include an ethylene-methyl (meth)acrylate copolymer, a styrene-methyl (meth)acrylate copolymer, a vinyl cyclohexane-methyl (meth)acrylate copolymer, a maleic anhydride-methyl (meth)acrylate copolymer, and an N-substituted maleimide-methyl (meth)acrylate copolymer.

Examples of the modified product may include a polymer into which a lactone ring structure is introduced by an intramolecular cyclization reaction; a polymer into which glutaric anhydride is introduced by an intramolecular cyclization reaction; and a polymer into which an imide structure is introduced by a reaction with an imidating agent (examples thereof include methylamine, cyclohexylamine, and ammonia), which sometimes hereinafter is referred to as a poly (meth)acrylimide resin.

Examples of the transparent resin film of the acrylic resin may include a film formed from one of them, and a film formed from a mixture of two or more thereof. These films encompass cast films, uniaxially oriented films and biaxially oriented films. Further, the transparent resin film encompasses laminated films with one or two or more types of these films in two or more layers.

The transparent resin film is more preferably a film of a vinyl cyclohexane-methyl (meth)acrylate copolymer. Using such a film of a vinyl cyclohexane-methyl (meth)acrylate copolymer can provide a hard coat laminated film excellent in resistance against a stylus, transparency, color tone, abrasion resistance, surface hardness, surface smoothness, appearance, stiffness, and moisture resistance, and the hard coat laminated film can be suitably used for a display faceplate of a smartphone or a tablet terminal. The content of the structural unit derived from methyl (meth)acrylate in the vinyl cyclohexane-methyl (meth)acrylate copolymer may be usually 50 to 95 mol %, preferably 65 to 90 mol %, and more preferably 70 to 85 mol %, assuming that the sum of structural units derived from all polymerizable monomers is 100 mol %. Here, the term "polymerizable monomers" means methyl (meth)acrylate, vinylcyclohexane, and (optionally added) monomers copolymerizable therewith. The copolymerizable monomer is usually a compound having a carbon-carbon double bond, and is typically a compound having an ethylenic double bond.

The transparent resin film is more preferably a film of a poly(meth)acrylimide resin. Using the film of the poly(meth)acrylimide resin can provide a hard coat laminated film excellent in resistance against a stylus, transparency, color tone, abrasion resistance, surface hardness, surface smoothness, appearance, stiffness, heat resistance, and dimensional stability against heat, and the hard coat laminated film can be suitably used for a display faceplate or a transparent conductive substrate of a smartphone or a tablet terminal.

The acrylic resin may have a yellowness index of preferably 3 or less, more preferably 2 or less, and still more preferably 1 or less (measured with a colorimeter "Solid-Spec-3700" (trade name) available from Shimadzu Corporation in accordance with JIS K7105:1981). Using the acrylic resin having a yellowness index of 3 or less enables the production of a hard coat laminated film which can be suitably used for a member in an image display device. A smaller yellowness index is more preferred.

The melt mass flow rate (measured under the conditions of 260° C. and 98.07 N according to ISO 1133) of the acrylic resin may be preferably 0.1 to 20 g/10 min and more preferably 0.5 to 10 g/10 min from viewpoints of extrusion load and stability of a melted film.

The acrylic resin may contain a core-shell rubber as desired. Using usually 0 to 100 parts by mass of the core-shell rubber, preferably 3 to 50 parts by mass, and more preferably 5 to 30 parts by mass based on 100 parts by mass of the acrylic resin can enhance cutting processability and impact resistance.

Examples of the core-shell rubber include core-shell rubbers formed of a methacrylate-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylate graft copolymer, a methacrylate/acrylate rubber graft copolymer and a methacrylate-acrylonitrile/acrylate rubber graft copolymer. One of them or a mixture of two or more thereof can be used for the core-shell rubber.

The acrylic resin can further contain, within a range that is not contrary to the object of the various embodiments, a thermoplastic resin other than the acrylic resin or core-shell rubber; a pigment, an inorganic filler, an organic filler, a resin filler; an additive such as a lubricant, an antioxidant, a weatherability stabilizer, a heat stabilizer, a releasing agent, an antistatic agent and a surfactant; or the like, as desired. The amount of the optional component(s) to be blended is usually about 0.01 to 10 parts by mass based on 100 parts by mass of the acrylic resin.

The transparent resin film is more preferably a transparent multilayer film with a first acrylic resin layer ($\alpha 1$); an aromatic polycarbonate resin layer ($\beta$); and a second acrylic resin layer ($\alpha 2$) directly laminated in this order. In the present specification, when the hard coat laminated film is used as a member of an image display device having a touch panel function, the various embodiments will be described assuming that a touch surface is formed on the al layer side.

While acrylic resins are excellent in surface hardness, they tend to be insufficient in cutting processability, whereas, although aromatic polycarbonate resins are excellent in cutting processability, the surface hardness tends to be insufficient. Therefore, using a transparent multilayer film having the above-described layer configuration enables to easily obtain a hard coat laminated film in which both substances cover for each other's drawbacks and which is excellent in both of surface hardness and cutting processability.

The layer thickness of the al layer, although not particularly limited, may be usually 20 μm or more, preferably 40 μm or more, more preferably 60 μm or more, and still more preferably 80 μm or more from a viewpoint of the surface hardness of the hard coat laminated film according to at least one embodiment.

The layer thickness of the $\alpha 2$ layer, although not particularly limited, is preferably the same layer thickness as the al layer from a viewpoint of the curling resistance of the hard coat laminated film according to at least one embodiment.

Here, "the same layer thickness" should not be interpreted as the same layer thickness in the physicochemically strict sense; but should be interpreted as the same layer thickness within a variation in a process/quality control commonly performed in industry. The reason is that the curling resistance of a multilayer film can be kept good if the layer thickness is the same layer thickness within a variation in a process/quality control commonly performed in industry. A cast multilayer film obtained by a T-die coextrusion method is usually subjected to a process/quality control within a variation of about −5 to +5 μm, and therefore, for example when a set layer thickness is 70 μm, the layer thickness of 65 μm and the layer thickness of 75 μm should be interpreted to be identical to each other. "The same layer thickness" here can be paraphrased as "substantially the same layer thickness".

The layer thickness of the 0 layer, although not particularly limited, may be usually 20 μm or more and preferably 80 μm or more from a viewpoint of the cutting processability of the hard coat laminated film according to at least one embodiment.

For the acrylic resin of the al layer and the $\alpha 2$ layer, those described above can be used.

For the acrylic resin to be used for the al layer and the acrylic resin to be used for the $\alpha 2$ layer, acrylic resins different in resin properties, for example, acrylic resins different in kind, melt mass flow rate, and glass transition temperature may be used. It is preferred to use acrylic resins having the same resin properties from a viewpoint of the curling resistance of the hard coat laminated film according to at least one embodiment. Using acrylic resins in the same grade and in the same lot is one of preferred embodiments, for example.

Examples of the aromatic polycarbonate resin to be used for the 0 layer include aromatic polycarbonate resins such as polymers obtained by interfacial polymerization of an aromatic dihydroxy compound such as bisphenol A, dimethyl bisphenol A and 1,1-bis(4-hydroxyphenyl)-3,3,5-trimethylcyclohexane with phosgene; and polymers obtained by a transesterification reaction of an aromatic dihydroxy compound such as bisphenol A, dimethyl bisphenol A and 1,1-bis(4-hydroxyphenyl)-3,3,5-trimethylcyclohexane with a carbonate diester such as diphenyl carbonate. One of them or a mixture of two or more thereof can be used for the aromatic polycarbonate resin of the 3 layer.

Preferred examples of optional components which can be contained in the aromatic polycarbonate resin may include core-shell rubbers. Using 0 to 30 parts by mass of a core-shell rubber (100 to 70 parts by mass of the aromatic polycarbonate resin), preferably 0 to 10 parts by mass of a core-shell rubber (100 to 90 parts by mass of the aromatic polycarbonate resin) based on 100 parts by mass of the total amount of the aromatic polycarbonate resin and the core-shell rubber can further enhance the cutting processability and the impact resistance of a hard coat laminated film.

Examples of the core-shell rubber include core-shell rubbers formed of a methacrylate-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylate graft copolymer, a methacrylate/acrylate rubber graft copolymer and a methacrylate-acrylonitrile/acrylate rubber graft copolymer. One of them or a mixture of two or more thereof can be used for the core-shell rubber.

The aromatic polycarbonate resin can further contain, within a range that is not contrary to the object of the various embodiments, a thermoplastic resin other than the aromatic polycarbonate resin or the core-shell rubber, a pigment, an inorganic filler, an organic filler, a resin filler, an additive such as a lubricant, an antioxidant, a weatherability stabilizer, a heat stabilizer, a releasing agent, an antistatic agent and a surfactant; or the like, as desired. The amount of the optional component(s) to be blended is usually about 0.01 to 10 parts by mass based on 100 parts by mass of the total amount of the aromatic polycarbonate resin and the core-shell rubber.

A method for producing the transparent resin film is not particularly limited. As a preferable production method in the case where the transparent resin film is a film of a poly(meth)acrylimide resin, the method described in JP-A-2015-033844 can be mentioned. As a preferable production method in the case where the transparent resin film is the transparent multilayer film with a first acrylic resin layer ($\alpha$1); an aromatic polycarbonate resin layer ($\beta$); and a second acrylic resin layer ($\alpha$2) directly laminated in this order, the method described in JP-A-2015-083370 can be mentioned. In forming a hard coat, an adhesion-facilitating treatment such as a corona discharge treatment and an anchor coat formation may be performed beforehand on the surface for forming the hard coat or both surfaces of the transparent resin film in order to enhance the adhesion strength to the hard coat.

The hard coat laminated film according to at least one embodiment more preferably includes the first hard coat, the second hard coat, and the layer of the transparent resin film and a third hard coat sequentially from the surface layer side. The third hard coat formed will allow a force to curl the hard coat laminated film in one direction (hereinafter, occasionally abbreviated as a curling force) and a force to curl the hard coat laminated film in another direction to work simultaneously. Then, the occurrence of curling can be suppressed by allowing these two curling forces to be canceled to be zero.

The components and the thickness of the third hard coat are not particularly limited as long as the two curling forces can be canceled. For the components and the thickness of the third hard coat, those described above for the second hard coat may be employed.

In recent years, a touch panel has been proposed which has a bilayer structure in which a touch sensor is directly provided on the back side of a display faceplate for the purpose of weight reduction of an image display device (so-called one-glass-solution). In addition, one-plastic-solution to substitute for the so-called one-glass-solution has also been proposed for the purpose of further weight reduction. In the case where the hard coat laminated film according to at least one embodiment is used for the one-plastic-solution to substitute for the so-called one-glass-solution, the third hard coat formed allows the hard coat laminated film to easily have properties suitable for a printed surface.

The hard coat laminated film according to at least one embodiment may have an optional layer(s) other than the first hard coat, the second hard coat, and the layer of the transparent resin film and the third hard coat, as desired. Examples of the optional layer include a hard coat other than the first to third hard coats, an anchor coat, a pressure-sensitive adhesive layer, a transparent electroconductive layer, a high refractive index layer, a low refractive index layer and a reflection-preventive layer.

FIG. 1 is a conceptual cross-sectional view showing an example of the hard coat laminated film according to at least one embodiment. When the hard coat laminated film of a non-limiting example shown in FIG. 1 is used as a member of an image display device having a touch panel function, the hard coat laminated film has a first hard coat 1, a second hard coat 2, a first poly(meth)acrylimide resin layer ($\alpha$1) 3, an aromatic polycarbonate resin layer ($\beta$) 4, a second poly(meth)acrylimide resin layer ($\alpha$2) 5, and a third hard coat 6 sequentially from the touch surface side.

The hard coat laminated film according to at least one embodiment may have a total light transmittance of preferably 85% or more, more preferably 88% or more, and still more preferably 90% or more (measured with a turbidimeter "NDH 2000" (trade name) available from Nippon Denshoku Industries Co., Ltd. in accordance with JIS K7361-1:1997). Due to the total light transmittance being 85% or more, the hard coat laminated film according to at least one embodiment can be suitably used for a member in an image display device. A higher total light transmittance is more preferred.

When the hard coat laminated film according to at least one embodiment is desired to have high clearness like glass, the hard coat laminated film may have a haze of preferably 2.0% or less, more preferably 1.5% or less, still more preferably 1.0% or less and most preferably 0.5% or less (measured with a turbidimeter "NDH 2000" (trade name) available from Nippon Denshoku Industries Co., Ltd. in accordance with JIS K7136:2000). A lower haze is more preferred. When the haze is 2.0% or less, the hard coat laminated film according to at least one embodiment has high clearness like glass.

When the hard coat laminated film according to at least one embodiment is desired to have an antiglare function, the hard coat laminated film may have a haze of usually 3% or more and preferably 5% or more (measured with a turbidimeter "NDH 2000" (trade name) available from Nippon Denshoku Industries Co., Ltd. in accordance with JIS K7136:2000), although depending on the level of antiglare properties to be imparted. On the other hand, the haze may be usually 30% or less and preferably 25% or less, from a viewpoint of preventing a displayed image from becoming chalky.

In the hard coat laminated film according to at least one embodiment, a surface of the first hard coat may have a pencil hardness of preferably 5H or higher, more preferably 6H or higher, still more preferably 7H or higher, even more preferably 8H or higher, and most preferably 9H or higher (measured with a pencil "uni" (trade name) available from Mitsubishi Pencil Co., Ltd. under conditions of a load of 750 g in accordance with JIS K5600-5-4). Due to the pencil hardness being 5H or more, the hard coat laminated film according to at least one embodiment can be suitably used for a member in an image display device. A higher pencil hardness is more preferred.

The hard coat laminated film according to at least one embodiment may have a minimum bending radius of preferably 50 mm or less, more preferably 40 mm or less, and still more preferably 30 mm or less. Due to the minimum bending radius being preferably 50 mm or less, the hard coat laminated film according to at least one embodiment can easily be handled as a film roll, so that this leads to an advantage in terms of production efficiency and the like. A smaller minimum bending radius is more preferred. Here, the minimum bending radius is a value determined by a test (xi) in Examples described later. The minimum bending radius referred to herein is a bending radius immediately before the occurrence of a crack in the surface of a bending portion when a hard coat laminated film is bent, and indicates the limit against bending. Bending radius is defined in the same manner as for radius of curvature.

Figure 2:
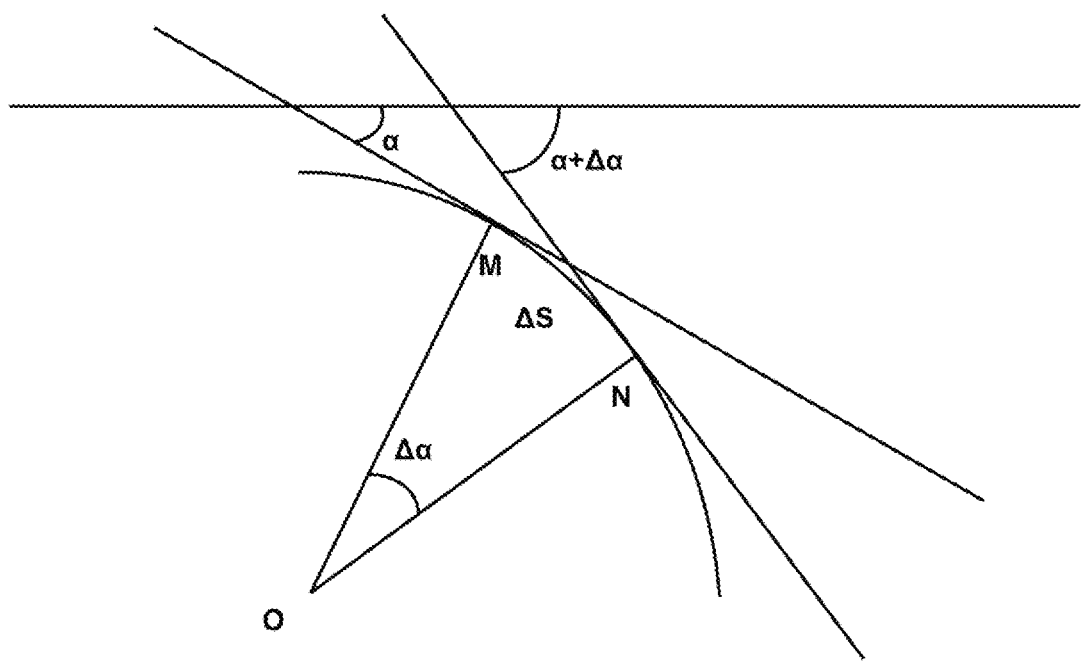
FIG. 2 is a diagram for describing a radius of curvature.

A radius of curvature is defined as follows in reference to FIG. 2. The length from the point M to the point N in the curve is denoted as $\Delta S$; the difference between the slope of the tangent line at the point M and the slope of the tangent line at the point N as $\Delta \alpha$; and the intersection of the line which is perpendicular to the tangent line at the point M and intersects with the point M and the line which is perpendicular to the tangent line at the point N and intersects with the point N, as O. In the case where $\Delta S$ is sufficiently small, the curve from the point M to the point N can be approximated to an arc (see FIG. 2). The radius in this case is defined as the radius of curvature. Further, if the radius of curvature is denoted as R, $\square MON=\Delta\alpha$. In the case where $\Delta S$ is sufficiently small, $\Delta\alpha$ is also sufficiently small and therefore $\Delta S=R\Delta\alpha$. As the result, $R=\Delta S/\Delta\alpha$.

In the hard coat laminated film according to at least one embodiment, the surface of the first hard coat may have a water contact angle of preferably 95° or more, more preferably 1000 or more, and still more preferably 1050 or more. In the case where the hard coat laminated film according to at least one embodiment is used for a display faceplate in a touch panel, the first hard coat will usually function as a touch surface. The water contact angle on the surface of the first hard coat of 95° or more enables to operate a touch panel at will by sliding fingers or a pen on the touch surface. From a viewpoint of sliding fingers or a pen at will, a higher water contact angle is more preferred. The upper limit of the water contact angle is not particularly limited, but the water contact angle of about 120° is usually enough from a viewpoint of finger slidability. Here, the water contact angle is a value determined by a test (iv) in Examples described later.

In the hard coat laminated film according to at least one embodiment, the water contact angle of the surface of the first hard coat after rubber abrasion may be preferably 95° or more, more preferably 1000 or more, and still more preferably 1050 or more after preferably 500 cycles of reciprocating rubber abrasion, more preferably 1000 cycles of reciprocating rubber abrasion, and still more preferably 1500 cycles of reciprocating rubber abrasion. Due to the fulfillment of such requirements by the hard coat laminated film, the surface properties such as finger slidability can be maintained even after repeated handwriting input of data. For the frequency of rubber abrasion during which a water contact angle of 95° or more can be maintained, a larger number is more preferred. Here, the water contact angle after rubber abrasion is a value determined by a test (v) in Examples described later. Since the water contact angle becomes small due to fine scratches on the surface of the first hard coat caused by rubber abrasion, the water contact angle after rubber abrasion is considered to be a kind of "abrasion resistance". In addition, since a pen tip of a touch pen used for the handwritten image recognition system of the touch panel is generally made of rubber or elastomer, the water contact angle after rubber abrasion is understood to be a typical index of "resistance against a stylus".

In the hard coat laminated film according to at least one embodiment, the water contact angle of the surface of the first hard coat after wipes with a cotton may be preferably 95° or more, more preferably 1000 or more, and still more preferably 1050 or more after preferably 20000 reciprocal wipes with a cotton and more preferably 25000 reciprocal wipes with a cotton. Due to the fulfillment of such requirements by the hard coat laminated film, the surface properties such as finger slidability can be maintained even after repeated wipes with a handkerchief or the like. For the number of wipes with a cotton during which a water contact angle of 95° or more can be maintained, a larger number is more preferred. Here, the water contact angle after wipes with a cotton is a value determined by a test (vi) in Examples described later.

In the hard coat laminated film according to at least one embodiment, resistance against steel wool of the first hard coat surface may be at a level at which no scratch is found preferably after 1500 cycles of reciprocating rubbings, more preferably after 1750 cycles of reciprocating rubbings, and still more preferably after 2000 cycles of reciprocating rubbings with steel wool. When the resistance against steel wool is at a high level, the hard coat laminated film according to at least one embodiment can be suitably used for a display faceplate of a touch panel. A higher resistance against steel wool is more preferred. Here, the resistance against steel wool is a value determined by a test (vii) in Examples described later.

In one embodiment, in the hard coat laminated film according to at least one embodiment, preferably, the water contact angle after rubber abrasion of the surface of the first hard coat may be 95° or more after 500 cycles of reciprocating rubber abrasion, and the resistance against steel wool of the first hard coat surface may be at a level at which no scratch is found after 1500 cycles of reciprocating rubbings with steel wool. Alternatively, the water contact angle after rubber abrasion of the first hard coat surface may be 95° or more after 1000 cycles of reciprocating rubber abrasion, and the resistance against steel wool of the first hard coat surface may be at a level at which no scratch is found after 1500 cycles of reciprocating rubbings with steel wool. Alternatively, the water contact angle after rubber abrasion of the first hard coat surface may be 95° or more after 1500 cycles of reciprocating rubber abrasion, and the resistance against steel wool of the first hard coat surface may be at a level at which no scratch is found after 1500 cycles of reciprocating rubbings with steel wool. Alternatively, the water contact angle after rubber abrasion of the first hard coat surface may be 95° or more after 500 cycles of reciprocating rubber abrasion, and the resistance against steel wool of the first hard coat surface may be at a level at which no scratch is found after 1750 reciprocating rubbings with steel wool. Alternatively, the water contact angle after rubber abrasion of the first hard coat surface may be 95° or more after 1000 cycles of reciprocating rubber abrasion, and the resistance against steel wool of the first hard coat surface may be at a level at which no scratch is found after 1750 reciprocating rubbings with steel wool. Alternatively, the water contact angle after rubber abrasion of the first hard coat surface may be 95° or more after 1500 cycles of reciprocating rubber abrasion, and the resistance against steel wool of the first hard coat surface may be at a level at which no scratch is found after 1750 cycles of reciprocating rubbings with steel wool. Alternatively, the water contact angle after rubber abrasion of the first hard coat surface may be 95° or more after 500 cycles of reciprocating rubber abrasion, and the resistance against steel wool of the first hard coat surface may be at a level at which no scratch is found after 2000 cycles of reciprocating rubbings with steel wool. Alternatively, the water contact angle after rubber abrasion of the first hard coat surface may be 95° or more after 1000 cycles of reciprocating rubber abrasion, and the resistance against steel wool of the first hard coat surface may be at a level at which no scratch is found after 2000 cycles of reciprocating rubbings with steel wool. Alternatively, the water contact angle after rubber abrasion of the first hard coat surface may be 95° or more after 1500 cycles of reciprocating rubber abrasion, and the resistance against steel wool of the first hard coat surface may be at a level at which no scratch is found after 2000 cycles of reciprocating rubbings with steel wool.

The hard coat laminated film according to at least one embodiment may have a yellowness index of preferably 3 or less, more preferably 2 or less and still more preferably 1 or less (measured with a colorimeter "SolidSpec-3700" (trade name) available from Shimadzu Corporation in accordance with JIS K7105:1981). A smaller yellowness index is more preferred. Due to the yellowness index being 3 or less, the hard coat laminated film can be suitably used for a member in an image display device.

Production Method

The method for producing the hard coat laminated film of according to at least one embodiment is not limited particularly, but it can be produced by using any method.

Preferred examples of the production method include a method comprising the following steps from a viewpoint of adhesiveness between the first hard coat and the second hard coat:

(1) coating a transparent resin film with a coating material for forming the second hard coat to form a first wet coat;

(2) irradiating the first wet coat formed from the coating material for forming the second hard coat with an active energy ray so that the integrated amount of light is 1 to 230 mJ/cm$^2$, preferably 5 to 200 mJ/cm$^2$, more preferably 10 to 160 mJ/cm$^2$, still more preferably 20 to 120 mJ/cm$^2$ and most preferably 30 to 100 mJ/cm$^2$ to convert the first wet coat formed from the coating material for forming the second hard coat into a coat in a set-to-touch state;

(3) coating the coat in a set-to-touch state formed from the coating material for forming the second hard coat with a coating material for forming the first hard coat to form a second wet coat; and (4) preheating the second wet coat formed from the coating material for forming the first hard coat to a temperature of 30 to 100° C., preferably to a temperature of 40 to 85° C., more preferably to a temperature of 50 to 75° C. followed by irradiating with an active energy ray so that the integrated amount of light is 240 to 10000 mJ/cm$^2$, preferably 320 to 5000 mJ/cm$^2$ and more preferably 360 to 2000 mJ/cm$^2$ to obtain a hard coat laminated film comprising the second hard coat formed from the coating material for forming the second hard coat and the first hard coat formed from the coating material for forming the first hard coat.

In the step (1), the method for forming the first wet coat from the coating material for forming the second hard coat is not particularly limited, and known web coating methods can be used. Examples of the above method may include roll coating, gravure coating, reverse coating, roll brushing, dip coating, spray coating, spin coating, air knife coating and die coating.

The first wet coat formed from the coating material for forming the second hard coat, which has been provided in the step (1), becomes in a set-to-touch state or in a state with no tackiness in the step (2) so that problems in handling such as sticking do not occur even in direct contact with a web apparatus. This enables to form the second wet coat on the coat in a set-to-touch state formed from the coating material for forming the second hard coat by using the coating material for forming the first hard coat in the next step (3).

The clause "a coat is in a set-to-touch state (in a state with no tackiness)" herein means that a coat is in a state in which, even when the coat directly comes into contact with a web apparatus, no problem in handling occurs.

The irradiation with an active energy ray in the step (2) is performed so that the integrated amount of light, although depending on the properties of a coating material to be used as the coating material for forming the second hard coat, is usually 1 mJ/cm$^2$ or more, preferably 5 mJ/cm$^2$ or more, more preferably 10 mJ/cm$^2$ or more, still more preferably 20 mJ/cm$^2$ or more and most preferably 30 mJ/cm$^2$ or more from a viewpoint of converting the coat into a coat in a set-to-touch state reliably. At the same time, the irradiation with an active energy ray is performed so that the integrated amount of light is usually 230 mJ/cm$^2$ or less, preferably 200 mJ/cm$^2$ or less, more preferably 160 mJ/cm$^2$ or less, still more preferably 120 mJ/cm$^2$ or less and most preferably 100 mJ/cm$^2$ or less from a viewpoint of the adhesiveness between the first hard coat and the second hard coat. The integrated amount of light in this step may be usually 1 mJ/cm$^2$ or more and 230 mJ/cm$^2$ or less, preferably 1 mJ/cm$^2$ or more and 200 mJ/cm$^2$ or less, or 1 mJ/cm$^2$ or more and 160 mJ/cm$^2$ or less, or 1 mJ/cm$^2$ or more and 120 mJ/cm$^2$ or less, or 1 mJ/cm$^2$ or more and 100 mJ/cm$^2$ or less, or preferably 5 mJ/cm$^2$ or more and 230 mJ/cm$^2$ or less, or 5 mJ/cm$^2$ or more and 200 mJ/cm$^2$ or less, or 5 mJ/cm$^2$ or more and 160 mJ/cm$^2$ or less, or 5 mJ/cm$^2$ or more and 120 mJ/cm$^2$ or less, or 5 mJ/cm$^2$ or more and 100 mJ/cm$^2$ or less, or preferably 10 mJ/cm$^2$ or more and 230 mJ/cm$^2$ or less, or 10 mJ/cm$^2$ or more and 200 mJ/cm$^2$ or less, or 10 mJ/cm$^2$ or more and 160 mJ/cm$^2$ or less, or 10 mJ/cm$^2$ or more and 120 mJ/cm$^2$ or less, or 10 mJ/cm$^2$ or more and 100 mJ/cm$^2$ or less, or preferably 20 mJ/cm$^2$ or more and 230 mJ/cm$^2$ or less, or 20 mJ/cm$^2$ or more and 200 mJ/cm$^2$ or less, or 20 mJ/cm$^2$ or more and 160 mJ/cm$^2$ or less, or 20 mJ/cm$^2$ or more and 120 mJ/cm$^2$ or less, or 20 mJ/cm$^2$ or more and 100 mJ/cm$^2$ or less, or preferably 30 mJ/cm$^2$ or more and 230 mJ/cm$^2$ or less, or 30 mJ/cm$^2$ or more and 200 mJ/cm$^2$ or less, or 30 mJ/cm$^2$ or more and 160 mJ/cm$^2$ or less, or 30 mJ/cm$^2$ or more and 120 mJ/cm$^2$ or less, or 30 mJ/cm$^2$ or more and 100 mJ/cm$^2$ or less.

The first wet coat formed from the coating material for forming the second hard coat is preferably predried before irradiating with an active energy ray in the step (2). The predrying can be performed by passing a web in a drying furnace with the temperature set to about 23 to 150° C., preferably with the temperature set to 50 to 120° C., at a line speed such that the time required to pass through from the inlet to the outlet is about 0.5 to 10 minutes and preferably 1 to 5 minutes, for example.

The first wet coat formed from the coating material for forming the second hard coat may be preheated to a temperature of 40 to 120° C., preferably to a temperature of 70 to 100° C. in advance of irradiating an active energy ray in the step (2). Such preheating enables to convert the coat into a set-to-touch state reliably. The method for preheating is not particularly limited, and any method can be performed. Specific examples of the method will be described later in the description of the step (4).

In the step (3), the method for forming the second wet coat from the coating material for forming the first hard coat is not particularly limited, and known web coating methods can be used. Examples of the above method may include roll coating, gravure coating, reverse coating, roll brushing, dip coating, spray coating, spin coating, air knife coating and die coating.

The second wet coat formed from the coating material for forming the first hard coat, which has been provided in the step (3), is completely cured in the step (4). Simultaneously, the coat in a set-to-touch state formed from the coating material for forming the second hard coat is also completely cured.

The above-described method enables to enhance the adhesiveness between the first hard coat and the second hard coat, and without wishing to be bound by any theory it is presumed that the reason is that complete curing is simultaneously achieved for both hard coats by limiting the integrated amount of light in irradiating an active energy ray to an amount adequate to convert the coat into a coat in a set-to-touch state but inadequate to completely cure the coat in the step (2) and setting the integrated amount of light to an amount adequate to completely cure the coat in the step (4) for the first time.

The irradiation with an active energy ray in the step (4) is performed so that the integrated amount of light is 240 mJ/cm$^2$ or more, preferably 320 mJ/cm$^2$ or more, and more preferably 360 mJ/cm$^2$ or more from a viewpoint of completely curing the coat and the adhesiveness between the first hard coat and the second hard coat. At the same time, the irradiation with an active energy ray is performed so that the integrated amount of light is 10000 mJ/cm$^2$ or less, preferably 5000 mJ/cm$^2$ or less, and more preferably 2000 mJ/cm$^2$ or less from a viewpoint of preventing the yellowing of a hard coat laminated film to be obtained and costs. The integrated amount of light in this step may be usually 240 mJ/cm$^2$ or more and 10000 mJ/cm$^2$ or less, preferably 240 mJ/cm$^2$ or more and 5000 mJ/cm$^2$ or less, or 240 mJ/cm$^2$ or more and 2000 mJ/cm$^2$ or less, or preferably 320 mJ/cm$^2$ or more and 10000 mJ/cm$^2$ or less, or 320 mJ/cm$^2$ or more and 5000 mJ/cm$^2$ or less, or 320 mJ/cm$^2$ or more and 2000 mJ/cm$^2$ or less, or preferably 360 mJ/cm$^2$ or more and 10000 mJ/cm$^2$ or less, or 360 mJ/cm$^2$ or more and 5000 mJ/cm$^2$ or less, or 360 mJ/cm$^2$ or more and 2000 mJ/cm$^2$ or less.

The second wet coat formed from the coating material for forming the first hard coat is preferably predried before irradiating with an active energy ray in the step (4). The predrying can be performed by passing a web in a drying furnace with the temperature set to about 23 to 150° C., preferably with the temperature set to 50 to 120° C., at a line speed such that the time required to pass through from the inlet to the outlet is about 0.5 to 10 minutes and preferably 1 to 5 minutes, for example.

Figure 3:
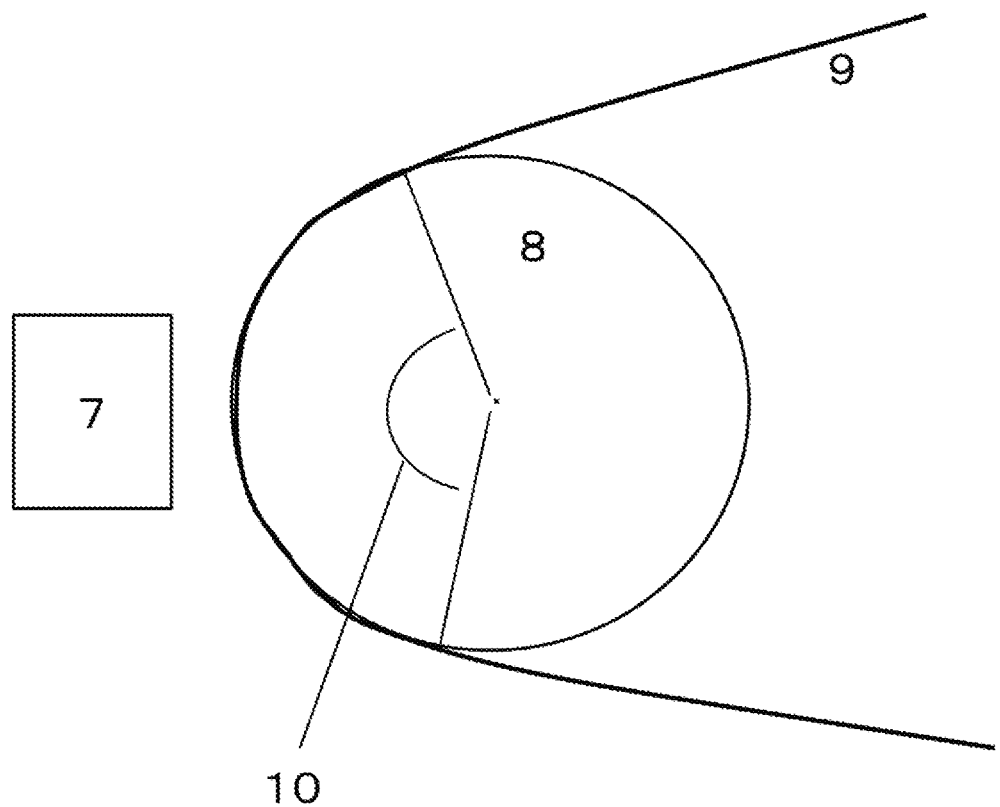
FIG. 3 is a conceptual diagram showing an example of a UV irradiator.

The wet coat formed from the coating material for forming the first hard coat is preheated usually to a temperature of 30 to 100° C., preferably to a temperature of 40 to 85° C. and more preferably to a temperature of 50 to 75° C. in advance of irradiating an active energy ray in the step (4) from a viewpoint of obtaining a good interlayer adhesion strength even in the case where the coating material for forming the first hard coat and the coating material for forming the second hard coat are largely different in properties. The temperature range may be preferably 30 to 85° C. or 30 to 75° C., or preferably 40 to 100° C. or 40 to 75° C., or preferably be 50 to 100° C. or 50 to 85° C. The method for preheating is not particularly limited, and any method can be used. Examples of the preheating method include: a method of controlling the surface temperature of a mirror-finished metal roll 8 to a predetermined temperature by holding a web 9 on the mirror-finished metal roll 8 opposed to an active energy ray irradiation device 7 as illustrated in FIG. 3 (a reference numeral 10 in the figure represents a holding angle); a method of surrounding an active energy ray irradiation device as an irradiation furnace and controlling the temperature inside the irradiation furnace to a predetermined temperature; and a combination thereof.

An aging treatment may be performed after the step (4). It is thereby possible to stabilize the properties of the hard coat laminated film.

Articles

Because the hard coat laminated film according to at least one embodiment has the properties described above, the hard coat laminated film can be suitably used for an article or a member of an article. The article according to at least one embodiment is an article (including a member of an article) including the hard coat laminated film according to at least one embodiment, and is not particularly limited. Examples of the above article (including a member of an article) include image display devices such as liquid crystal displays, plasma displays, and electroluminescent displays, and members such as display faceplates, transparent conductive substrates, and housings thereof; televisions, personal computers, tablet-type information devices, smartphones, and members such as housings and display faceplates thereof; refrigerators, washing machines, cupboards, costume shelves, and panels constituting them; windows and doors of buildings, and the like; vehicles, windows of vehicles, windshields, roof windows, instrument panels, and the like; electronic signboards and protective plates thereof; show windows; and solar cells and members such as housings and front plates thereof.

In producing an article according according to at least one embodiment, in order to impart high designability to an obtained article, a decorative sheet may be laminated on a surface of the hard coat laminated film according to at least one embodiment, opposite to the front face of the film (the face which is normally visually recognized when the article is provided for actual use: the same also applies to hereinafter). Such an embodiment is particularly effective when the hard coat laminated film according to at least one embodiment is used as a panel constituting a front face of a door body for opening and closing a front portion of a main body of an article such as a refrigerator, a washing machine, a cupboard, or a costume shelf, or as a panel constituting a plane of a lid body for opening and closing a flat portion of the main body. The decorative sheet is not limited, but any decorative sheet can be used. As the decorative sheet, for example, any colored resin sheet can be used.

Examples of the colored resin sheet include colored resin sheets made of a polyester resin such as aromatic polyester or aliphatic polyester; an acrylic resin; a polycarbonate resin; a poly(meth)acrylimide resin; a polyolefin resin such as polyethylene, polypropylene, or polymethylpentene; a cellulose resin such as cellophane, triacetylcellulose, diacetylcellulose, or acetylcellulose butyrate; a styrene resin such as polystyrene, an acrylonitrile-butadiene-styrene copolymer resin (ABS resin), a styrene-ethylene-propylene-styrene copolymer, a styrene-ethylene-ethylene-propylene-styrene copolymer, or a styrene-ethylene-butadiene-styrene copolymer; a polyvinyl chloride resin; a polyvinylidene chloride resin; a fluorine-containing resin such as polyvinylidene fluoride; polyvinyl alcohol, ethylene vinyl alcohol, polyether ether ketone, nylon, polyamide, polyimide, polyurethane, polyetherimide, polysulfone, polyethersulfone, or the like. These sheets include an unstretched sheet, a uniaxially stretched sheet, and a biaxially stretched sheet. Further, the colored resin sheet encompasses laminated sheets with one or two or more types of these sheets in two or more layers.

The thickness of the colored resin sheet is not particularly limited, but may be usually 20 μm or more, preferably 50 μm or more, and more preferably 80 μm or more. At the same time, the thickness of the colored resin sheet may be usually 1500 μm or less, preferably 800 μm or less, and more preferably 400 μm or less from a viewpoint of meeting a demand for thickness reduction of an article.

A printed layer may be provided on a front side surface of the colored resin sheet, as desired, in order to enhance the sense of design. The printed layer is provided for imparting high designability, and can be formed by printing any pattern using any ink and any printing machine.

Printing can be performed directly or via an anchor coat entirely or partially on a surface of the hard coat laminated film according to at least one embodiment, opposite to the front face of the film and/or on a front side surface of the colored resin sheet. Examples of the pattern include a metal-like pattern such as hair lines, a grain pattern, a stone mesh pattern imitating a surface of a rock such as marble, a fabric pattern imitating texture or a cloth-like pattern, a tile stitch pattern, a brickwork pattern, a parquet pattern, and a patchwork. As the printing ink, an ink obtained by appropriately mixing a pigment, a solvent, a stabilizer, a plasticizer, a catalyst, a curing agent, and the like with a binder can be used. Examples of the binder include a resin such as a polyurethane resin, a vinyl chloride-vinyl acetate copolymer resin, a vinyl chloride-vinyl acetate-acrylic copolymer resin, a chlorinated polypropylene resin, an acrylic resin, a polyester resin, a polyamide resin, a butyral resin, a polystyrene resin, a nitrocellulose resin, or a cellulose acetate resin, and a resin composition thereof. In addition, in order to provide a metal-like design, aluminum, tin, titanium, indium, an oxide thereof, or the like may be vapor-deposited directly or via an anchor coat entirely or partially on a surface of the hard coat laminated film according to at least one embodiment, opposite to the front face of the film and/or on a front side surface of the colored resin sheet by a known method.

Lamination of the hard coat laminated film according to at least one embodiment and the decorative sheet is not particularly limited, but can be performed by any method. Examples of the method include a dry lamination method using a known adhesive and a method for forming a layer including a known pressure-sensitive adhesive and then superimposing and pressing both of the film and the sheet.

EXAMPLES

The various embodiments will be now described by referring to Examples, but the various embodiments are not limited to these Examples.

Measuring Method (i) Total Light Transmittance

The total light transmittance was measured according to JIS K7361-1:1997 by using a turbidimeter "NDH2000" (trade name) of Nippon Denshoku Industries Co., Ltd.

(ii) Haze

The haze was measured according to JIS K7136:2000 by using a turbidimeter "NDH2000" (trade name) available from Nippon Denshoku Industries Co., Ltd.

(iii) Yellowness Index

The yellowness index was measured according to JIS K7105:1981 by using a colorimeter "SolidSpec-3700" (trade name) available from Shimadzu Corporation.

(iv) Water Contact Angle

The water contact angle of a hard coat laminated film was measured for the surface of the first hard coat with an automatic contact angle meter "DSA 20" (trade name) available from KRUSS GmbH by using a method to calculate from the width and the height of a water drop (see JIS R3257:1999).

(v) Abrasion Resistance 1 (Water Contact Angle after Rubber Abrasion)

A test piece taken such that the size thereof was 150 mm in length and 25 mm in width and the machine direction of a hard coat laminated film was in the longitudinal direction of the test piece was placed on a Gakushin-type tester according to JIS L0849:2013 (friction tester type 1) such that the first hard coat of the hard coat laminated film was a surface. A plastic eraser "Mars Plastic 528 55" (trade name) available from Staedlter Nippon K.K. was attached to a friction terminal of the Gakushin-type tester. The eraser has a cylindrical shape with a diameter of 7 mm and a length of 96 mm. The resultant was set so that the entire surface of one of bottom surfaces of the eraser come into contact with the test piece, a load of 500 g was applied, and after the first hard coat surface of the test piece was rubbed 500 times reciprocatingly under conditions of a moving distance of the friction terminal of 60 mm and a speed of one reciprocation/sec., the water contact angle on the rubber abrasion portion was measured in accordance with the method in the (iv) described above. In the case where the water contact angle was 95° or more, the operation of additionally carrying out 500 cycles of reciprocating rubbings and then measuring the water contact angle on the rubber abrasion portion in accordance with the method in the (iv) was repeated, and evaluation was performed by using the following criteria.

A: The water contact angle was 95° or more even after 1500 cycles of reciprocation.

B: Although the water contact angle was 95° or more after 1000 cycles of reciprocation, the water contact angle was less than 95° after 1500 cycles of reciprocation.

C: Although the water contact angle was 95° or more after 500 cycles of reciprocation, the water contact angle was less than 95° after 1000 cycles of reciprocation.

D: The water contact angle was less than 95° after 500 cycles of reciprocation.

(vi) Abrasion Resistance 2 (Water Contact Angle after Wipes with Cotton)

A test piece taken such that the size thereof was 150 mm in length and 25 mm in width and the machine direction of a hard coat laminated film was in the longitudinal direction of the test piece was placed on a Gakushin-type tester according to JIS L0849:2013 (friction tester type 1) such that the first hard coat of the hard coat laminated film was a surface. A stainless steel sheet (10 mm length, 10 mm width, 1 mm thickness) covered with a four-ply gauze (a type 1 medical gauze available from Kawamoto Corporation) was attached to a friction terminal of the Gakushin-type tester, and the resultant was set so that the sheet face of the stainless steel sheet came into contact with the test piece and a load of 350 g was applied. After 10000 cycles of reciprocating rubbings of the surface of the first hard coat of the test piece under conditions that the moving distance of the friction terminal was 60 mm and the speed was one reciprocation/sec, the water contact angle on the cotton-wiped portion was measured in accordance with the method in the (iv) described above. In the case where the water contact angle was 95° or more, the operation of additionally carrying out 5000 cycles of reciprocating rubbings and then measuring the water contact angle on the cotton-wiped portion in accordance with the method in the (iv) was repeated, and evaluation was performed by using the following criteria.

A: The water contact angle was 95° or more even after 25000 cycles of reciprocation.

B: Although the water contact angle was 95° or more after 20000 cycles of reciprocation, the water contact angle was less than 95° after 25000 cycles of reciprocation.

C: Although the water contact angle was 95° or more after 15000 cycles of reciprocation, the water contact angle was less than 95° after 20000 cycles of reciprocation.

D: Although the water contact angle was 95° or more after 10000 cycles of reciprocation, the water contact angle was less than 95° after 15000 cycles of reciprocation.

E: The water contact angle was less than 95° after 10000 cycles of reciprocation.

(vii) Abrasion Resistance 3 (Resistance Against Steel Wool)

A test piece taken such that the size thereof was 150 mm in length and 50 mm in width and the machine direction of a hard coat laminated film was in the longitudinal direction of the test piece was placed on a Gakushin-type tester according to JIS L0849:2013 (friction tester type 1) such that the first hard coat was a surface. A steel wool of #0000 was subsequently attached to a friction terminal of the Gakushin-type tester and a load of 500 g was then applied. After 1000 cycles of reciprocating rubbings of the surface of the test piece under conditions that the moving speed of the friction terminal is 300 mm/min and the moving distance is 30 mm, the rubbed portion was visually observed. In the case where no scratch was found, the operation of additionally carrying out 250 reciprocating rubbings and then visually observing the rubbed portion was repeated, and evaluation was performed by using the following criteria.

A: No scratches were found even after 2000 cycles of reciprocation.

B: No scratches were found after 1750 cycles of reciprocation but scratches were found after 2000 cycles of reciprocation.

C: No scratches were found after 1500 cycles of reciprocation but scratches were found after 1750 cycles of reciprocation.

D: No scratches were found after 1250 cycles of reciprocation but scratches were found after 1500 cycles of reciprocation.

E: No scratches were found after 1000 cycles of reciprocation but scratches were found after 1250 cycles of reciprocation.

F: Scratches were found after 1000 cycles of reciprocation.

(viii) Pencil Hardness

The pencil hardness of a hard coat laminated film was measured for the surface of the first hard coat according to JIS K5600-5-4:1999 by using a pencil "UNI" (trade name) of Mitsubishi Pencil Co., Ltd under the conditions of a test length of 25 mm and a load of 750 g.

(ix) Surface Smoothness (Surface Appearance)

The surface (i.e., each of both surfaces) of a hard coat laminated film was visually observed while irradiating with a fluorescent light from various incident angles, and evaluation was performed by using the following criteria.

⊚ (very good): No undulations or flaws were found on the surface. No cloudiness was perceived even when the surface was seen through with a light irradiated closely.

○ (good): A portion with a little cloudiness was found when the surface was seen through with a light irradiated closely.

Δ (slightly poor): Undulations or flaws were found on the surface in a small quantity when the surface was looked at closely. Further, cloudiness was perceived.

x (poor): Undulations or flaws were found on the surface in a large quantity. Further, cloudiness was clearly perceived.

(x) Cross-Cut Test (Adhesiveness)

In accordance with JIS K5600-5-6:1999, a square lattice pattern cut consisting of 100 cells (1 cell=1 mm×1 mm) was provided on the hard coat laminated film from the first hard coat surface side. Thereafter, a tape for adhesion tests was attached on the square lattice pattern cut and rubbed with fingers and then peeled off. The criteria for evaluation were in accordance with Table 1 in the above standard of JIS.

Classification 0: The edges of the cuts were completely smooth; none of the squares of the lattice was detached.

Classification 1: Detachment of small flakes of the coat was seen at the intersections of the cuts. A cross-cut area of not greater than 5% was affected.

Classification 2: The coat flaked along the edges and/or at the intersections of the cuts. A cross-cut area of greater than 5%, but not greater than 15%, was affected.

Classification 3: The coat flaked along the edges of the cuts partly or wholly in large ribbons, and/or it flaked partly or wholly on different parts of the squares. A cross-cut area of greater than 15%, but not greater than 35%, was affected.

Classification 4: The coat flaked along the edges of the cuts partly or wholly in large ribbons and/or some squares detached partly or wholly. A cross-cut area of greater than 35%, but not greater than 65%, was affected.

Classification 5: This criterion was defined as the case where the degree of flaking was greater than that in Classification 4.

(xi) Minimum Bending Radius

With reference to Bending Formability (B method) in JIS-K6902:2007, a test piece of a hard coat laminated film was conditioned at a temperature of 23° C.±2° C. and a relative humidity of 50±5% for 24 hours, and thereafter the test piece was bent to form a curve at a bending temperature of 23° C.+2° C. at a bending line with a direction perpendicular to the machine direction of the hard coat laminated film so that the first hard coat of the hard coat laminated film was on the outer side, and for the resultant, measurement was performed. The radius of the front face of the shaping jig having the smallest radius of the front face among shaping jigs with no crack generated was defined as the minimum bending radius. The "front face" has the same meaning as the term regarding a shaping jig in the B method defined in Paragraph 18.2 in JIS K6902:2007.

(xii) Cutting Processability (Condition of Curved Cutting-Processed Line)

A hard coat laminated film was provided with a cut hole in true circle with a diameter of 2 mm and a cut hole in true circle with a diameter of 0.5 mm by using a router processing machine automatically controlled with a computer. The mill used then was a four-bladed super-hard-alloy mill with nicks that has a cylindrically round tip, and the blade diameter was appropriately selected depending on a portion to be processed. Subsequently, the cut hole with a diameter of 2 mm was observed for the cut edge surface visually or with a microscope (100×) and evaluation was performed by using the following criteria. Similarly, the cut hole with a diameter of 0.5 mm was observed for the cut edge surface visually or with a microscope (100×) and evaluation was performed by using the following criteria. The result of the former case and the result of the latter case were listed in this order in the tables below.

⊚ (very good): No crack or burr was found even in microscopic observation.

○ (good): No crack was found even in microscopic observation. However, a burr was found.

Δ (slightly poor): No crack was visually found. However, a crack was found in microscopic observation.

x (poor): A crack was found even in visual observation.

Raw Materials Used (A) Polyfunctional (Meth)Acrylate (A-1) "Biscoat #802" (trade name) available from Osaka Organic Chemical Industry Ltd., a mixture of tripentaerythritol acrylate, dipentaerythritol acrylate, monopentaerythritol acrylate, and polypentaerythritol acrylate. The content of tripentaerythritol acrylate in this product is 60% by mass.

(A-2) Dipentaerythritol hexaacrylate (hexafunctional)

(A-3) Pentaerythritol triacrylate (trifunctional)

(B) Compound having two or more secondary thiol groups in each molecule (B-1) "Karenz MT PE-" (trade name) of Showa Denko K.K., a compound having four secondary thiol groups in each molecule. Pentaerythritol tetrakis (3-mercaptobutyrate).

(B-2) "Karenz MT NR-1" (trade name) of Showa Denko K.K., a compound having three secondary thiol groups in each molecule. 1,3,5-tris(3-mercaptobutyryloxyethyl)-1,3,5-triazine-2,4,6 (1H,3H,5H)-trione.

(B-3) "Karenz MT BD-i" (trade name) of Showa Denko K.K., a compound having two secondary thiol groups in each molecule. 1,4-bis(3-mercaptobutyryloxy)butane.

(C) Water-repellant agent (C-1) An acryloyl group-containing fluoropolyether water repellant "KY-1203" (trade name) available from Shin-Etsu Chemical Co., Ltd. Solid content: 20% by mass.

(C-2) A methacryloyl group-containing fluoropolyether water repellant "FOMBLIN MT70" (trade name) available from Solvay S.A. Solids content: 70% by mass.

(D) Silane coupling agent (D-1)N-2-(aminoethyl)-3-aminopropylmethyldimethoxysilane "KBM-602" (trade name) available from Shin-Etsu Chemical Co., Ltd.

(E) Photopolymerization initiator (E-1) A thiophenyl-based photopolymerization initiator (2-methyl-1-(4-methylthiophenyl)-2-morpholinopropan-1-one) available from BASF SE "IRGACURE 907" (trade name).

(E-2) A phenyl ketone photopolymerization initiator (1-hydroxycyclohexyl phenyl ketone) "SB-PI714" (trade name) available from Shuang Bang Industrial Corp.

(E-3) An acetophenone photopolymerization initiator (2-hydroxy-1-{4-[4-(2-hydroxy-2-methyl-propionyl)-benzyl]phenyl}-2-methyl-propane-1-one) "IRGACURE 127" (trade name) available from BASF SE.

(F) Inorganic fine particles having an average particle diameter of 1 to 300 nm (F-1) Silica fine particles having an average particle diameter of 20 nm the surface of which has been treated with a silane coupling agent having a vinyl group (G) Leveling agent (G-1) A silicone-acrylic copolymer leveling agent "DISPARLON NSH-8430HF" (trade name) available from Kusumoto Chemicals, Ltd. Solids content: 10% by mass.

Optional component (PGM) 1-methoxy-2-propanol (propylene glycol monomethyl ether).

(H1) Coating material for forming first hard coat (H1-1) A coating material was obtained by mixing and stirring 100 parts by mass of the (A-1), 5 parts by mass of the (B-1), 5 parts by mass (1 part by mass in terms of solid content) of the (C-1), 0.15 parts by mass (0.105 parts by mass in terms of solid content) of the (C-2), 0.5 parts by mass of the (D-1), 1 part by mass of the (E-1), 2.5 parts by mass of the (E-2), 0.5 parts by mass of the (E-3), and 130 parts by mass of the (PGM). The formation is shown in Table 1. Note that the amounts in terms of solid content are listed for the (C-1) and (C-2) in the table.

(H1-2 to H1-10) Each coating material was obtained in the same way as in the (H1-1) except that the components and their ratios were changed as shown in Tables 1 to 3. Note that the amounts in terms of solid content are listed for the (C-1) and (C-2) in the table.

(H2) Coating material for forming second hard coat (H2-1) A coating material was obtained by mixing and stirring 100 parts by mass of the (A-3), 17 parts by mass of the (E-2), 140 parts by mass of the (F-1), 2 parts by mass (0.2 parts by mass in terms of solid content) of the (G-1), and 200 parts by mass of the (PGM).

(H2-2) A coating material was obtained by mixing and stirring 100 parts by mass of the (A-3), 17 parts by mass of the (E-2), 80 parts by mass of the (F-1), 2 parts by mass (0.2 parts by mass in terms of solid content) of the (G-1), and 155 parts by mass of the (PGM).

(H2-3) A coating material was obtained by mixing and stirring 100 parts by mass of the (A-3), 17 parts by mass of the (E-2), 30 parts by mass of the (F-1), 2 parts by mass (0.2 parts by mass in terms of solid content) of the (G-1), and 120 parts by mass of the (PGM).

Figure 4:
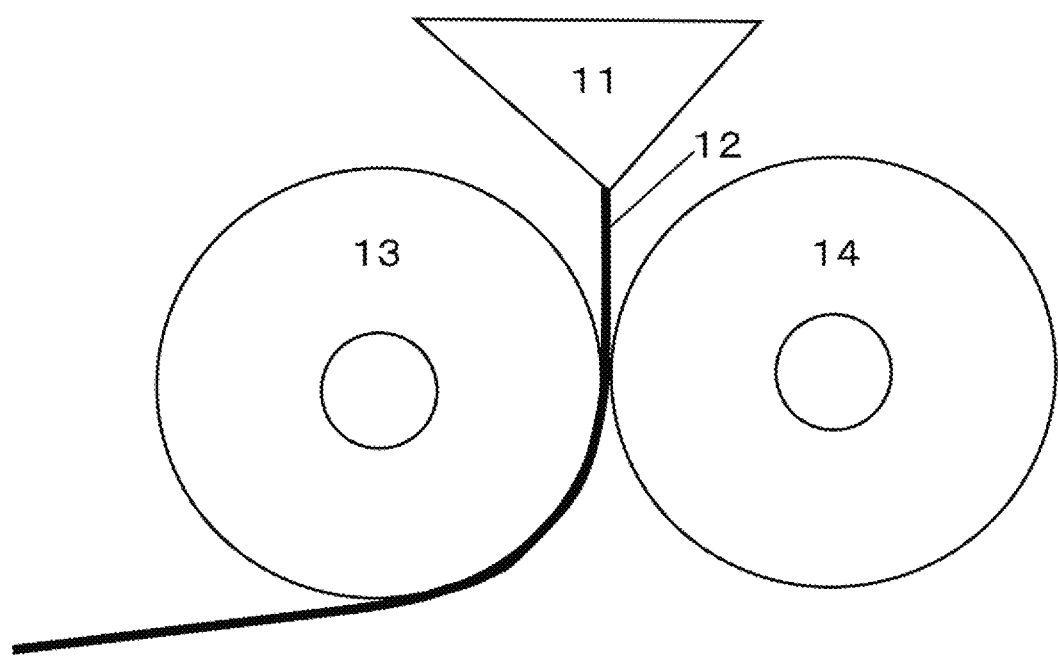
FIG. 4 is a conceptual diagram of a film forming apparatus used in Examples.

(P) Transparent Resin Film (P-1) Using an apparatus (see FIG. 4) including a two-component/three-layer multimanifold-type coextrusion T-die 11 and a winder having a mechanism to pressurize a melted film with a first mirror-finished roll 13 (i.e., a roll to hold a melted film 12 and send the melted film 12 to a subsequent transfer roll) and a second mirror-finished roll 14, a two-component/three-layer multilayer resin film in which both outer layers (al layer and α2 layer) were formed of a poly(meth)acrylimide "PLEXIMID TI50" (trade name) available from Evonik Industry AG and an intermediate layer (β layer) was formed of an aromatic polycarbonate "CALIBRE 301-4" (trade name) available from Sumika Styron Polycarbonate Limited was continuously coextruded from the coextrusion T-die 11. The coextruded product was supplied and introduced between the rotating first mirror-finished roll 13 and the rotating second mirror-finished roll 14 so that the al layer was on the first mirror-finished roll 13 side, and pressurized to obtain a transparent resin film having a total thickness of 250 μm, a thickness of the al layer of 80 μm, a thickness of the β layer of 90 μm, and a thickness of the α2 layer of 80 μm. Regarding the conditions set for this operation, the temperature of the T-die, the temperature of the first mirror-finished roll, the temperature of the second mirror-finished roll and the wind-up speed were set to 300° C., 130° C., 120° C. and 6.5 m/min, respectively.

(P-2) A transparent resin film was obtained in the same way as in the (P-1) except that an acrylic resin comprised of a structural unit derived from methyl methacrylate in an amount of 76.8 mol % and a structural unit derived from vinylcyclohexane in an amount of 23.2 mol %, assuming that the sum of structural units derived from polymerizable monomers was 100 mol %, was used as both outer layers in place of the "PLEXIMID TI50" (trade name).

Example 1

Both surfaces of the (P-1) were subjected to a corona discharge treatment. Both surfaces had a wetting index of 64 mN/m. Subsequently, the surface on the α1 layer side was coated with the (H2-1) by using a die-type applicator so that the wet coat thickness was 40 μm (thickness after curing: 22 μm), thus obtaining a wet coat of (H2-1). Subsequently, the wet coat of (H2-1) was caused to pass through a drying furnace set at an inner temperature of 90° C. at a line speed such that the time required to pass from the inlet to the outlet was one minute. Then, the wet coat was treated with a curing apparatus (see FIG. 3) having a UV irradiator 7 of high-pressure mercury lamp type and a mirror-finished metal roll 8 having a diameter of 25.4 cm which were disposed opposite to each other, under conditions that the temperature of the mirror-finished metal roll 8 was 90° C. and the integrated amount of light was 80 mJ/cm². As a result, the wet coat formed of the (H2-1) became a coat in a set-to-touch state. Subsequently, the coat in a set-to-touch state formed of the (H2-1) was coated with the (H1-1) by using a die-type applicator so that the wet coat thickness was 6.3 μm (thickness after curing: 1.7 μm). Subsequently, the coated material was caused to pass through a drying furnace set at an inner temperature of 70° C. at a line speed such that the time required to pass from the inlet to the outlet was one minute. Then, the resultant was treated with a curing apparatus (see FIG. 3) having a UV irradiator 7 of high-pressure mercury lamp type and a mirror-finished metal roll 8 having a diameter of 25.4 cm which were disposed opposite to each other, under conditions that the temperature of the mirror-finished metal roll 8 was 70° C. and the integrated amount of light was 700 mJ/cm² to form a first hard coat and a second hard coat. Subsequently, a third hard coat was formed on the surface on the α2 layer side with the same coating material as in forming the second hard coat (e.g., the (H2-1) in Example 1) by using a die-type applicator so that the thickness after curing was the same as that of the second hard coat (the thickness after curing was 22 μm in Example 1), and a hard coat laminated film was finally obtained. The above tests (i) to (xii) were carried out. The results are shown in Table 1.

Examples 2 to 10, 14 and 15

Production of a hard coat laminated film and measurement and evaluation of physical properties thereof were performed in a similar manner to Example 1 except that the coating material shown in each one of Tables 1 to 3 was used as the coating material for forming the first hard coat in place of the (H1-1) and the wet coat thickness was appropriately adjusted so that the thickness after curing of the hard coat was the same as in Example 1. The results are shown in any one of Tables 1 to 3.

Example 11

Production of a hard coat laminated film and measurement and evaluation of physical properties thereof were performed in a similar manner to Example 1 except that the (H2-2) was used as the coating material for forming the second hard coat in place of the (H2-1) and the wet coat thickness was appropriately adjusted so that the thickness after curing of the hard coat was the same as in Example 1. The results are shown in Table 3.

Example 12

Production of a hard coat laminated film and measurement and evaluation of physical properties thereof were performed in a similar manner to Example 1 except that the (H2-3) was used as the coating material for forming the second hard coat in place of the (H2-1) and the wet coat thickness was appropriately adjusted so that the thickness after curing of the hard coat was the same as in Example 1. The results are shown in Table 3.

Example 13

Production of a hard coat laminated film and measurement and evaluation of physical properties thereof were performed in a similar manner to Example 1 except that the (P-2) was used as a transparent resin film in place of the (P-1) and the wet coat thickness was appropriately adjusted so that the thickness after curing of the hard coat was the same as in Example 1. The results are shown in Table 3.

TABLE 1

| | | Ex. 1 | Ex. 2 | Ex. 3 | Ex. 4 | Ex. 5 |
|---|---|---|---|---|---|---|
| Coating material for forming 1st hard coat | | H1-1 | H1-2 | H1-3 | H1-4 | H1-5 |
| Formulation of coating material for forming 1st HC (parts by mass) | A-1 | 100 | 100 | 100 | 100 | 100 |
| | A-2 | — | — | — | — | — |
| | B-1 | 5 | 10 | 3 | 1 | — |
| | B-2 | — | — | — | — | — |
| | B-3 | — | 1 | — | 1 | 1 |
| | C-1 | 1 | 1 | 1 | 1 | 1 |
| | C-2 | 0.105 | 0.105 | 0.105 | 0.105 | 0.105 |
| | D-1 | 0.5 | 0.5 | 0.5 | 0.5 | 0.5 |
| | E-1 | 1 | 1 | 1 | 1 | 1 |
| | E-2 | 2.5 | 2.5 | 2.5 | 2.5 | 2.5 |
| | E-3 | 0.5 | 0.5 | 0.5 | 0.5 | 0.5 |
| | PGM | 130 | 130 | 130 | 130 | 130 |
| Coating material for forming 2nd hard coat | | H2-1 | H2-1 | H2-1 | H2-1 | H2-1 |
| Transparent resin film | | P-1 | P-1 | P-1 | P-1 | P-1 |
| Evaluation results | Total light transmittance % | 90.9 | 90.9 | 90.9 | 90.9 | 90.9 |
| | Haze % | 0.2 | 0.2 | 0.2 | 0.2 | 0.2 |
| | Yellowness index | 0.3 | 0.3 | 0.3 | 0.3 | 0.3 |
| | Water contact angle deg | 116 | 116 | 116 | 116 | 116 |
| | Abrasion resistance1 | A | A | A | C | D |
| | Abrasion resistance2 | A | A | A | A | A |

TABLE 1-continued

|  | Ex. 1 | Ex. 2 | Ex. 3 | Ex. 4 | Ex. 5 |
|---|---|---|---|---|---|
| Abrasion resistance3 | A | A | A | A | A |
| Pencil hardness | 9H | 9H | 9H | 9H | 9H |
| Surface smoothness | ⊚ | ⊚ | ⊚ | ⊚ | ⊚ |
| Cross-cut test | Class 0 | Class 0 | Class 0 | Class 0 | Class 0 |
| Minimum bending radius mm | 40 | 40 | 40 | 40 | 40 |
| Cutting processability | ⊚-◯ | ⊚-◯ | ⊚-◯ | ⊚-◯ | ⊚-◯ |

TABLE 2

|  |  | Ex. 6 | Ex. 7 | Ex. 8 | Ex. 9 | Ex. 10 |
|---|---|---|---|---|---|---|
| Coating material for forming $1^{st}$ hard coat |  | H1-6 | H1-7 | H1-8 | H1-9 | H1-10 |
| Formulation of coating material for forming $1^{st}$ HC (parts by mass) | A-1 | 100 | 100 | 100 | — | 50 |
|  | A-2 | — | — | — | 100 | 50 |
|  | B-1 | — | — | 5 | 5 | 5 |
|  | B-2 | 5 | — | — | — | — |
|  | B-3 | — | 5 | — | — | — |
|  | C-1 | 1 | 1 | 1 | 1 | 1 |
|  | C-2 | 0.105 | 0.105 | 0.105 | 0.105 | 0.105 |
|  | D-1 | 0.5 | 0.5 | 0.5 | 0.5 | 0.5 |
|  | E-1 | 1 | 1 | — | 1 | 1 |
|  | E-2 | 2.5 | 2.5 | 4 | 2.5 | 2.5 |
|  | E-3 | 0.5 | 0.5 | — | 0.5 | 0.5 |
|  | PGM | 130 | 130 | 130 | 130 | 130 |
| Coating material for forming $2^{nd}$ hard coat |  | H2-1 | H2-1 | H2-1 | H2-1 | H2-1 |
| Transparent resin film |  | P-1 | P-1 | P-1 | P-1 | P-1 |
| Evaluation results | Total light transmittance % | 90.9 | 90.9 | 90.9 | 90.9 | 90.9 |
|  | Haze % | 0.2 | 0.2 | 0.2 | 0.2 | 0.2 |
|  | Yellowness index | 0.3 | 0.3 | 0.3 | 0.3 | 0.3 |
|  | Water contact angle deg | 116 | 116 | 116 | 116 | 116 |
|  | Abrasion resistance 1 | A | A | B | C | B |
|  | Abrasion resistance 2 | A | A | A | A | A |
|  | Abrasion resistance 3 | A | A | A | E | C |
|  | Pencil hardness | 9H | 9H | 9H | 7H | 8H |
|  | Surface smoothness | ⊚ | ⊚ | ⊚ | ⊚ | ⊚ |
|  | Cross-cut test | Class 0 | Class 0 | Class 0 | Class 0 | Class 0 |
|  | Minimum bending radius mm | 40 | 40 | 40 | 40 | 40 |
|  | Cutting processability | ⊚-◯ | ⊚-◯ | ⊚-◯ | ⊚-◯ | ⊚-◯ |

TABLE 3

|  |  | Ex. 11 | Ex. 12 | Ex. 13 | Ex. 14 | Ex. 15 |
|---|---|---|---|---|---|---|
| Coating material for forming $1^{st}$ hard coat |  | H1-1 | H1-1 | H1-1 | H1-11 | H1-12 |
| Formulation of coating material for forming $1^{st}$ HC (parts by mass) | A-1 | 100 | 100 | 100 | 100 | 100 |
|  | A-2 | — | — | — | — | — |
|  | B-1 | 5 | 5 | 5 | 5 | 5 |
|  | B-2 | — | — | — | — | — |
|  | B-3 | — | — | — | — | — |
|  | C-1 | 1 | 1 | 1 | 1 | — |
|  | C-2 | 0.105 | 0.105 | 0.105 | 0.105 | — |
|  | D-1 | 0.5 | 0.5 | 0.5 | 0.5 | 0.5 |
|  | E-1 | 1 | 1 | 1 | 1 | 1 |
|  | E-2 | 2.5 | 2.5 | 2.5 | 2.5 | 2.5 |
|  | E-3 | 0.5 | 0.5 | 0.5 | 0.5 | 0.5 |
|  | F-1 | — | — | — | 20 | — |
|  | PGM | 130 | 130 | 130 | 130 | 130 |
| Coating material for forming $2^{nd}$ hard coat |  | H2-2 | H2-3 | H2-1 | H2-1 | H2-1 |
| Transparent resin film |  | P-1 | P-1 | P-2 | P-1 | P-1 |
| Evaluation results | Total light transmittance % | 91.1 | 91.2 | 90.9 | 90.1 | 90.1 |
|  | Haze % | 0.2 | 0.1 | 0.2 | 0.3 | 0.3 |
|  | Yellowness index | 0.3 | 0.3 | 0.3 | 0.3 | 0.3 |
|  | Water contact angle deg | 116 | 116 | 116 | 116 | 74 |
|  | Abrasion resistance 1 | A | A | A | D | — |
|  | Abrasion resistance 2 | A | A | A | E | — |
|  | Abrasion resistance 3 | A | A | A | F | F |
|  | Pencil hardness | 8H | 5H | 8H | 9H | 7H |

TABLE 3-continued

|  | Ex. 11 | Ex. 12 | Ex. 13 | Ex. 14 | Ex. 15 |
| --- | --- | --- | --- | --- | --- |
| Surface smoothness | ⊚ | ⊚ | ⊚ | ⊚ | ⊚ |
| Cross-cut test | Class 0 | Class 0 | Class 0 | Class 0 | Class 0 |
| Minimum bending radius mm | 30 | 30 | 40 | 40 | 40 |
| Cutting processability | ⊚-○ | ⊚-○ | ⊚-○ | ⊚-○ | ⊚-○ |

These results reveal that the hard coat laminated film according to at least one embodiment is excellent in water contact angle after rubber abrasion (i.e., an index of resistance against a stylus). In addition, it has been found that the preferred hard coat laminated film according to at least one embodiment is excellent in water contact angle (i.e., an index of antifouling properties), water contact angle after rubber abrasion (i.e., an index of resistance against a stylus), transparency, color tone, abrasion resistance, surface hardness, and surface appearance.

In Example 14, additionally, the abrasion resistance 1 (water contact angle after rubber abrasion) in the test (v) was also measured after 100 cycles of reciprocation, so that the water contact angle was already less than 95° (87°). In Example 15, since an initial water contact angle was 72°, the measurements of the abrasion resistance 1 (water contact angle after rubber abrasion) in the test (v) and the abrasion resistance 2 (water contact angle after wipes with cotton) in the test (vi) were omitted.

Therefore, the hard coat laminated film according to at least one embodiment can be suitably used for a member in an image display device such as a liquid crystal display, a plasma display and an electroluminescence display (including an image display device with a touch panel function and an image display device with no touch panel function), particularly for a display faceplate in an image display device with a touch panel function and with a handwritten image recognition system installed.

REFERENCE SIGNS LIST

1 First hard coat
2 Second hard coat
3 First poly(meth)acrylimide resin layer (α1)
4 Aromatic polycarbonate resin layer (β)
5 Second poly(meth)acrylimide resin layer (α2)
6 Third hard coat
7 UV irradiator
8 Mirror-finished metal roll
9 Web
10 Holding angle
11 T-die
12 Molten resin film
13 First mirror-finished roll
14 Second mirror-finished roll

The invention claimed is:

1. A hard coat laminated film, comprising:
a first hard coat;
a second hard coat; and
a layer of a transparent resin film sequentially from the surface layer side,
wherein the first hard coat is formed from a coating material that does not contain inorganic particles, while containing:
100 parts by mass of (A) a polyfunctional (meth) acrylate;
0.5 to 20 parts by mass of (B) a compound having two or more secondary thiol groups in each molecule;
0.01 to 7 parts by mass of (C) a water repellent agent; and
0.01 to 10 parts by mass of (D) a silane coupling agent,
wherein (B) the compound having two or more secondary thiol groups in each molecule is selected from the group consisting of:
1,4-bis(3-mercaptobutyryloxy)butane;
1,3,5-tris(3-mercaptobutyryloxyethyl)-1,3,5-triazine-2,4,6(1H,3H,5H)-trione;
trimethylolpropane tris(3-mercaptobutyrate);
trimethylolethane tris(3-mercaptobutyrate); and
pentaerythritol tetrakis(3-mercaptobutyrate), and
wherein the second hard coat is formed from a coating material that contains:
100 parts by mass of (A) a polyfunctional (meth) acrylate; and
30 to 300 parts by mass of (F) inorganic fine particles having an average particle diameter of 1 to 300 nm.

2. The hard coat laminated film according to claim 1, wherein (A) the polyfunctional (meth)acrylate contains 20% by mass or more of tripentaerythritol acrylate.

3. The hard coat laminated film according to claim 1, wherein the coating material for forming the first hard coat additionally contains 0.1 to 5 parts by mass of (E) a thiophenyl-based photopolymerization initiator.

4. The hard coat laminated film according to claim 1, wherein the (D) silane coupling agent contains one or more selected from the group consisting of a silane coupling agent having an amino group and a silane coupling agent having a mercapto group.

5. The hard coat laminated film according to claim 1, wherein the (C) water-repellent agent contains a (meth) acryloyl group-containing fluoropolyether water repellant.

6. The hard coat laminated film according to claim 1, wherein the coating material for forming the second hard coat further contains (G) 0.01 to 1 part by mass of a leveling agent.

7. A hard coat laminated film, comprising:
a first hard coat;
a second hard coat; and
a layer of a transparent resin film sequentially from the surface layer side,
wherein the first hard coat is formed from a coating material that does not contain inorganic particles and that contains (B) a compound having two or more secondary thiol groups in each molecule,
wherein (B) the compound having two or more secondary thiol groups in each molecule is selected from the group consisting of:
1,4-bis(3-mercaptobutyryloxy)butane;
1,3,5-tris(3-mercaptobutyryloxyethyl)-1,3,5-triazine-2,4,6(1H,3H,5H)-trione;
trimethylolpropane tris(3-mercaptobutyrate);
trimethylolethane tris(3-mercaptobutyrate); and
pentaerythritol tetrakis(3-mercaptobutyrate);
wherein the second hard coat is formed from a coating material that contains inorganic particles, and wherein a water contact angle of a surface of the first hard coat is 95° or more after 500 cycles of reciprocating rubber abrasion.

8. The hard coat laminated film according to claim 7, wherein the coating material for forming the first hard coat contains:
(A) a polyfunctional (meth)acrylate;
(B) the compound having two or more secondary thiol groups in each molecule;
(C) a water-repellant agent; and
(D) a silane coupling agent.

9. The hard coat laminated film according to claim 8, wherein (A) the polyfunctional (meth)acrylate contains 20% by mass or more of tripentaerythritol acrylate.

10. The hard coat laminated film according to claim 8, wherein the coating material for forming the first hard coat additionally contains (E) a thiophenyl-based photopolymerization initiator.

11. The hard coat laminated film according to claim 1, wherein the transparent resin film is a transparent multilayer film with a first acrylic resin layer ($\alpha$1); an aromatic polycarbonate resin layer ($\beta$); and a second acrylic resin layer ($\alpha$2) directly laminated in this order.

12. An image display device comprising the hard coat laminated film according to claim 1.

13. The hard coat laminated film according to claim 7, wherein the transparent resin film is a transparent multilayer film with a first acrylic resin layer ($\alpha$1); an aromatic polycarbonate resin layer ($\beta$); and a second acrylic resin layer ($\alpha$2) directly laminated in this order.

14. An image display device comprising the hard coat laminated film according to claim 7.

15. The hard coat laminated film according to claim 7, wherein a pencil hardness of a surface of the first hard coat is 6H or more.

16. The hard coat laminated film according to claim 1, wherein a pencil hardness of a surface of the first hard coat is 6H or more.

* * * * *